(12) United States Patent
Zhang et al.

(10) Patent No.: US 11,892,735 B2
(45) Date of Patent: Feb. 6, 2024

(54) ARRAY SUBSTRATE, LIGHT CONTROL PANEL, AND DISPLAY DEVICE WITH INCLINING SIGNAL LINE SEGMENTS AND WIRE PORTIONS

(71) Applicants: HEFEI BOE DISPLAY TECHNOLOGY CO., LTD., Anhui (CN); BOE TECHNOLOGY GROUP CO., LTD., Beijing (CN)

(72) Inventors: Ruifeng Zhang, Beijing (CN); Jincheng Gao, Beijing (CN); Tao Jiang, Beijing (CN); Guanyong Zhang, Beijing (CN)

(73) Assignees: HEFEI BOE DISPLAY TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 532 days.

(21) Appl. No.: 16/977,319

(22) PCT Filed: Nov. 25, 2019

(86) PCT No.: PCT/CN2019/120635
§ 371 (c)(1),
(2) Date: Sep. 1, 2020

(87) PCT Pub. No.: WO2021/102633
PCT Pub. Date: Jun. 3, 2021

(65) Prior Publication Data
US 2022/0382114 A1 Dec. 1, 2022

(51) Int. Cl.
*G02F 1/1362* (2006.01)

(52) U.S. Cl.
CPC .. *G02F 1/136286* (2013.01); *G02F 1/136204* (2013.01)

(58) Field of Classification Search
CPC .................................. G02F 1/133628
See application file for complete search history.

(56) References Cited

U.S. PATENT DOCUMENTS

| 8,269,936 B2 | 9/2012 | Itoh et al. |
| 10,007,155 B2 | 6/2018 | Hirosawa |
| (Continued) | | |

FOREIGN PATENT DOCUMENTS

| CN | 101802699 A | 8/2010 |
| CN | 104749839 A | 7/2015 |
| (Continued) | | |

*Primary Examiner* — Richard H Kim

(57) ABSTRACT

An array substrate, a light control panel and a display device are disclosed. The array substrate includes first and second signal lines. The first signal line includes bending-line structures including first to third wire portions; a center lines of the first wire portion intersects with a center line of the second wire portion to form a first angle; the second wire portion includes first and second sides; sides of the first and third wire portions closer to the second signal line respectively intersect with the first side at first, and second positions; sides of an orthographic projection of the second signal line on an electrode layer where the first signal line is located are intersected with the first side at third and fourth positions; a length of a line segment between first and second position is greater than a length of a line segment between third and fourth position.

18 Claims, 19 Drawing Sheets

(56) References Cited

U.S. PATENT DOCUMENTS

| | | | |
|---|---|---|---|
| 10,108,055 B2 | 10/2018 | Park et al. | |
| 2017/0146869 A1* | 5/2017 | Hirosawa | G02F 1/136286 |
| 2019/0206296 A1 | 7/2019 | Shin et al. | |
| 2020/0292894 A1 | 9/2020 | Liu et al. | |

FOREIGN PATENT DOCUMENTS

| | | |
|---|---|---|
| CN | 206523727 U | 9/2017 |
| CN | 108983463 A | 12/2018 |

* cited by examiner

… (2)

ARRAY SUBSTRATE, LIGHT CONTROL PANEL, AND DISPLAY DEVICE WITH INCLINING SIGNAL LINE SEGMENTS AND WIRE PORTIONS

CROSS REFERENCE TO RELATED APPLICATION

This application claims the priority of International Application No. PCT/CN2019/120635, filed on Nov. 25, 2019. The entire disclosures of the above applications are incorporated herein by reference.

TECHNICAL FIELD

Embodiments of the present disclosure relate to an array substrate, a light control panel and a display device.

BACKGROUND

A liquid crystal display device includes a backlight module (backlight unit) and a liquid crystal panel, and the backlight module is provided on a non-display side of the liquid crystal panel to provide a light source for realizing a display operation of a display panel. The liquid crystal panel includes a polarizer, an array substrate, an opposite substrate, and a liquid crystal molecular layer filled between the array substrate and the opposite substrate. The liquid crystal display device allows liquid crystal molecules in the liquid crystal molecule layer to be rotated by forming an electric field between the array substrate and the opposite substrate, and the rotated liquid crystal molecules cooperate with the polarizer to form a liquid crystal light valve. Because the liquid crystal molecular layer itself does not emit light, the backlight module is needed to realize the display function. With the continuous development of display technology, users have put forward higher and higher requirements on the contrast, brightness uniformity, and reliability of a display device.

SUMMARY

At least one embodiment of the present disclosure provides an array substrate, which comprises: a first signal line for a sub-pixel row, and a second signal line for a sub-pixel column. The first signal line as a whole extends in a first direction; the second signal line as a whole extends in a second direction that is intersected with the first direction; the first signal line comprises a plurality of bending-line structures directly connected in sequence, and each of the plurality of bending-line structures comprises a first wire portion, a second wire portion and a third wire portion directly connected in sequence; an extension direction of the first wire portion and an extension direction of the third wire portion are both intersected with the first direction and the second direction, and the second wire portion extends along the first direction; a center line, extending along the extension direction of the first wire portion, of the first wire portion is intersected with a center line, extending along an extension direction of the second wire portion, of the second wire portion to form a first angle; the second wire portion comprises a first side and a second side opposite to each other in the second direction, and the first side is located at an inner side of the first angle and the second side is located at an outer side of the first angle; a side of the first wire portion closer to the second signal line is intersected with the first side at a first position of the first side, and a side of the third wire portion closer to the second signal line is intersected with the first side at a second position of the first side; a side, closer to the first wire portion, of an orthographic projection of the second signal line on an electrode layer where the first signal line is located is intersected with the first side at a third position of the first side, and a side, closer to the third wire portion, of the orthographic projection of the second signal line on the electrode layer where the first signal line is located is intersected with the first side at a fourth position of the first side; and a length of a line segment between the first position and the second position of the first side is greater than a length of a line segment between the third position and the fourth position of the first side.

For example, in at least one example of the array substrate, the third position and the fourth position are both between the first position and the second position.

For example, in at least one example of the array substrate, the second signal line comprises a first line segment; the first line segment is a portion of the second signal line between the first wire portion and the second wire portion; and the first line segment and the third wire portion are inclined toward a same direction with respect to the second direction.

For example, in at least one example of the array substrate, the third position is between a first midpoint and the first position, and the first midpoint is a midpoint of the line segment between the first position and the second position of the first side.

For example, in at least one example of the array substrate, the first signal line is a gate line; an inclination angle of the third wire portion relative to the second direction is greater than three times an inclination angle of the first line segment relative to the second direction and smaller than four times the inclination angle of the first line segment relative to the second direction; the second signal line is a data line, and a width of the first wire portion is greater than twice a width of the second signal line and smaller than three times the width of the second signal line, or the second signal line is a common electrode line and the width of the first wire portion is greater than three times a width of the second signal line and smaller than four times the width of the second signal line; and the width of the first wire portion is smaller than a length of the second side and greater than a length of the line segment between the first position and the second position of the first side.

For example, in at least one example of the array substrate, the third position is coincident with the first position.

For example, in at least one example of the array substrate, a width of the first wire portion is equal to a width of the third wire portion; and a width of the second wire portion is greater than the width of the first wire portion and smaller than twice the width of the first wire portion.

For example, in at least one example of the array substrate, the third position is between a first midpoint and the second position; the first midpoint is a midpoint of the line segment between the first position and the second position of the first side; and an orthographic projection of an intersection point of the second side and the side, closer to the first wire portion, of the orthographic projection of the second signal line on the electrode layer where the first signal line is located on the first side is located at a side of the first midpoint away from the third position.

For example, in at least one example of the array substrate, the first signal line is a gate line; an inclination angle of the third wire portion relative to the second direction is greater than three times an inclination angle of the first line segment relative to the second direction and smaller than four times the inclination angle of the first line segment relative to the second direction; the second signal line is a data line and a width of the first wire portion is greater than twice a width of the second signal line and smaller than three times the width of the second signal line, or the second signal line is a common electrode line and a width of the first wire portion is greater than three times a width of the second signal line and smaller than four times the width of the second signal line; the width of the first wire portion is greater than a length of the second side; and a width of the second wire portion is greater than twice the width of the first wire portion and smaller than three times the width of the first wire portion.

For example, in at least one example of the array substrate, the third position is at a first midpoint, and the first midpoint is a midpoint of the line segment between the first position and the second position of the first side.

For example, in at least one example of the array substrate, a width of the second wire portion is greater than a width of the first wire portion and a width of the third wire portion; and the width of the first wire portion is equal to the width of the third wire portion.

For example, in at least one example of the array substrate, the fourth position is coincident with the second position.

For example, in at least one example of the array substrate, an angle of a slope of at least one of the first signal line and the second signal line is between 40 degrees and 60 degrees.

At least one embodiment of the present disclosure provides a light control panel, which comprises: an opposite substrate, a liquid crystal layer, and any array substrate provided by at least one embodiment of the present disclosure. The array substrate and the opposite substrate are arranged oppositely, and the liquid crystal layer is sandwiched between the array substrate and the opposite substrate.

At least one embodiment of the present disclosure provides a display device, which comprises: a display panel, a backlight unit, and any light control panel provided by at least one embodiment of the present disclosure. The display panel, the light control panel and the backlight unit are stacked, the display panel is located on a light output side of the light control panel, and the backlight unit is located on a side of the light control panel away from the display panel.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first", "second", etc., which are used in the description and the claims of the present application for disclosure, are not intended to indicate any sequence, amount or importance, but distinguish various components. The terms "comprise", "comprising", "include", "including", etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On", "under", "right", "left" and the like are only used to indicate relative position relationship, and when the position of the object which is described is changed, the relative position relationship may be changed accordingly.

The inventors of the present disclosure have noted in research that a display panel of an ordinary liquid crystal display device (for example, a liquid crystal display device based on advanced super dimension switch technology with a single liquid crystal cell) usually has a problem of light leakage in a dark state, this causes the contrast of the display image displayed by the liquid crystal display device to be relatively low. The inventors of the present disclosure have noted in research that a liquid crystal display device with dual liquid crystal cells (that is, a liquid crystal display device based on regional brightness adjustment technology with dual liquid crystal cells) can be used to improve the contrast of the display image, and the following is an exemplary description with reference to FIG. 1A to FIG. 1B and FIG. 2A to FIG. 2B.

Figure 1A:
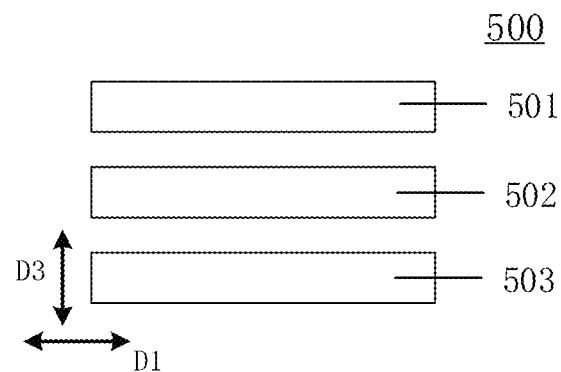
FIG. 1A is a schematic cross-sectional diagram of a liquid crystal display device.

FIG. 1A illustrates a schematic cross-sectional diagram of a liquid crystal display device 500. As illustrated in FIG. 1A, the liquid crystal display device 500 includes a backlight unit 503, a light control panel 502, and a display panel 501 that are sequentially arranged in a third direction D3. For example, the light control panel 502 is configured to adjust the intensity of light which is emitted by the backlight unit 503 and is incident on the display panel 501. For example, the light emitted by the light control panel 502 is white light, that is, the light control panel 502 does not have a color adjustment function.

Figure 1B:
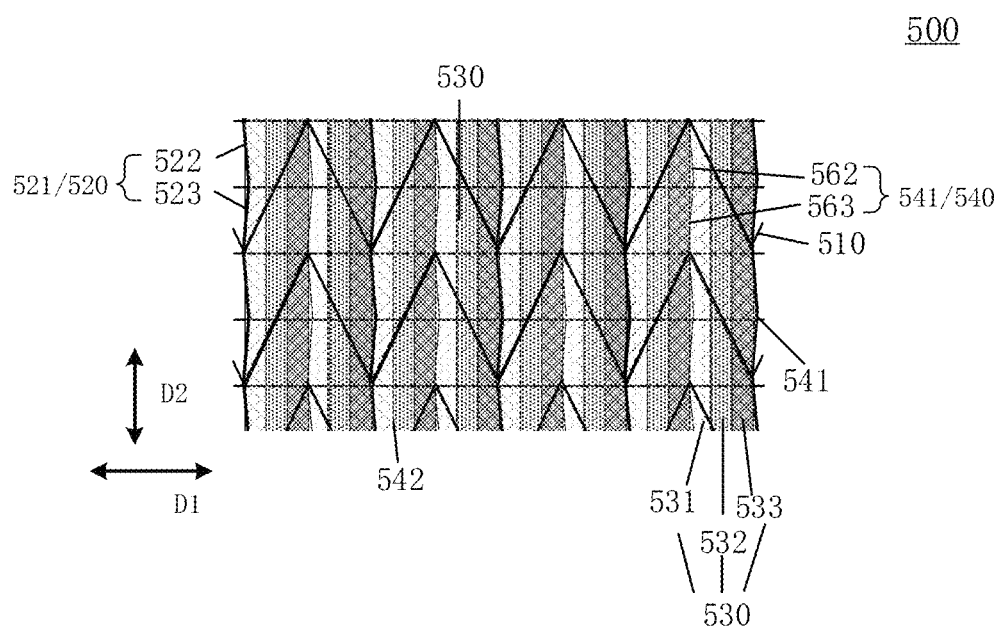
FIG. 1B illustrates a schematic plan view of a light control panel and a display panel of the liquid crystal display device as illustrated in FIG. 1A.
Figure 2A:
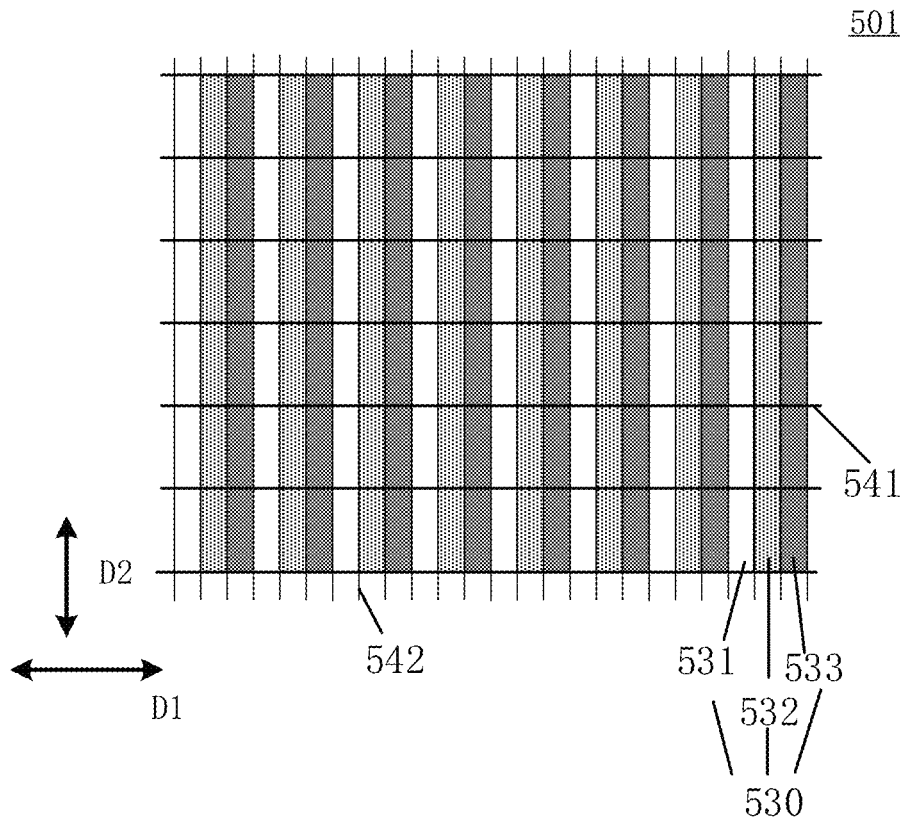
FIG. 2A illustrates a schematic plan view of the display panel of the liquid crystal display device as illustrated in FIG. 1A.

FIG. 1B illustrates a schematic plan view of the light control panel 502 and the display panel 501 of the liquid crystal display device 500 as illustrated in FIG. 1A; FIG. 2A illustrates a schematic plan view of the display panel 501 of the liquid crystal display device 500 as illustrated in FIG. 1A; and FIG. 2B illustrates a schematic plan view of an array substrate of the light control panel 502 of the liquid crystal display device 500 as illustrated in FIG. 1A.

As illustrated in FIG. 1B and FIG. 2A, the display panel 501 includes a plurality of first signal lines 541 extending in a first direction D1 and a plurality of second signal lines 542 extending in a second direction D2. The plurality of first signal lines 541 are intersected with the plurality of second signal lines 542 to define a plurality of display sub-pixel units arranged in an array, and the plurality of display sub-pixel units form a plurality of display pixel units 530 arranged in an array. Each display pixel unit 530 includes a first display sub-pixel unit 531, a second display sub-pixel unit 532 and a third display sub-pixel unit 533. For example, the first display sub-pixel unit 531, the second display sub-pixel unit 532 and the third display sub-pixel unit 533 are respectively a red display sub-pixel unit, a green display sub-pixel unit and a blue display sub-pixel unit. For example, the first direction D1, the second direction D2, and the third direction D3 are intersected with each other (for example, perpendicular to each other). For example, the first signal line 541 is a gate line of the display panel 501, and the second signal line 542 is a data line of the display panel 501.

For example, the light control panel 502 includes an array substrate (see FIG. 2B), a liquid crystal layer (not illustrated in the figures) and an opposite substrate (not illustrated in the figures) that are sequentially arranged in the third direction D3.

Figure 2B:
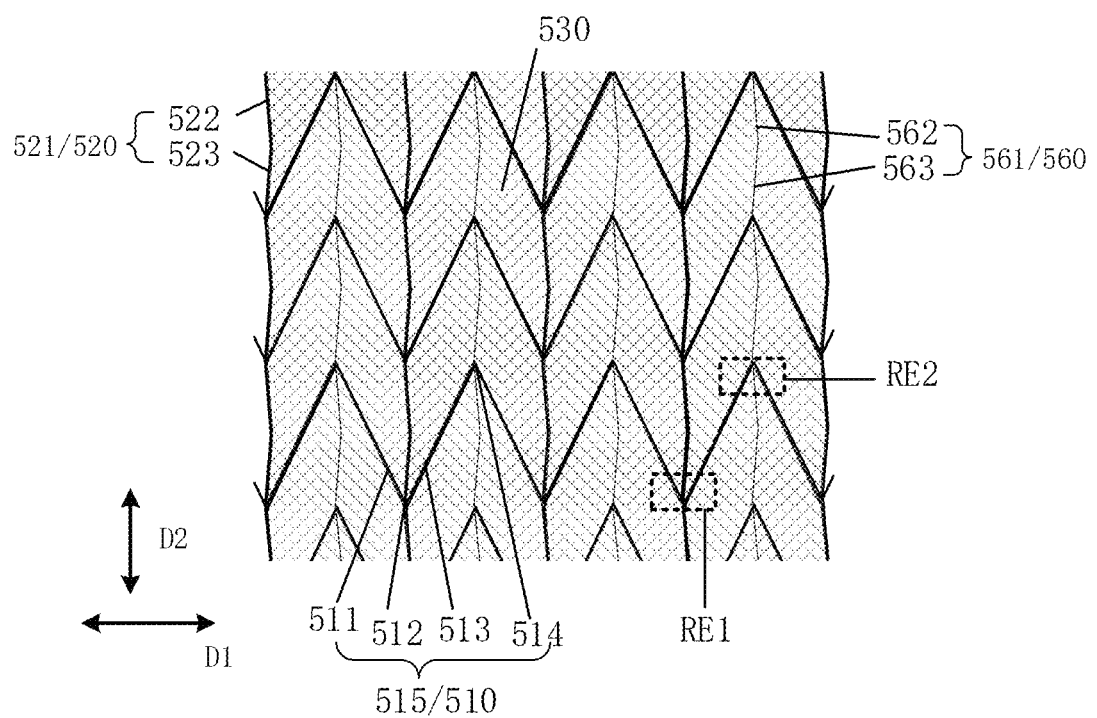
FIG. 2B illustrates a schematic plan view of an array substrate of the light control panel of the liquid crystal display device as illustrated in FIG. 1A.

As illustrated in FIG. 1B and FIG. 2B, the array substrate of the light control panel 502 includes a plurality of gate lines 510 respectively extending along the first direction D1 and a plurality of data lines 520 respectively extending along the second direction D2. The plurality of gate lines 510 are intersected with the plurality of signal lines 520 to define a plurality of light control pixel units 530. For example, the light control panel 502 further includes a plurality of common electrode lines 560 respectively extending along the second direction D2. For example, the plurality of data lines 520 and the plurality of common electrode lines 560 are alternately arranged in the first direction D1.

For example, the light control panel 502 includes a plurality of light control units (not illustrated in the figures) arranged in an array. For example, the plurality of light control pixel units 530 of the array substrate are respectively arranged in corresponding light control units. For example, the light control unit further includes a portion, that is stacked with the light control pixel unit in the third direction D3, of a liquid crystal layer and a portion, that is stacked with the light control pixel unit in the third direction D3, of an opposite substrate.

For example, the light control panel 502 can adjust the transmittance of each light control unit of the light control panel based on data signals received by the data lines 520, and therefore, the light control unit of the light control panel 502 can be used to control the intensity of light that is incident on a display sub-pixel unit, corresponding to the light control unit, of the display panel 501, such that the light control panel 502 can be used to provide adjusted backlight to the display panel 501. For example, by providing the light control panel 502 in the display device 500, the transmittance of a light control unit corresponding to a region, with a relatively low brightness (for example, zero brightness), of an image displayed by the liquid crystal display device can be caused to be relatively low (for example, the transmittance is equal to or close to zero), in this case, the potential adverse influence of the dark-state light leakage problem of the display panel 501 on the contrast of the display image is relatively small, thereby adopting a liquid crystal display device with dual liquid crystal cells (that is, the display device having the light control panel) can improve the contrast of the display image. For example, by providing the light control panel 502 in the display device 500, the contrast of the liquid crystal display device 500 can be increased from 1000 to more than 40,000.

However, the inventors of the present disclosure have noted in research that the possibility that a defect, caused by electrostatic discharge (for example, during production and/or use), is presented in the array substrate of the light control panel 502 of the liquid crystal display device 500 as illustrated in FIG. 1 is relatively large, thereby reducing the yield and reliability of the liquid crystal display device 500. The inventors of the present disclosure have noted in research (for example, by conducting a statistical analysis of the locations of defects, caused by electrostatic discharge, in a plurality of array substrates) that defects caused by electrostatic discharge (for example, a short circuit) are more likely to occur in the overlapping region of the data line 520 and the gate line 510 and the overlapping region of the common electrode line 560 and the gate line 510. The following is an exemplary description with reference to FIG. 1A to FIG. 1B, FIG. 2A to FIG. 2B, and FIG. 3A to FIG. 3C.

As illustrated in FIG. 1B and FIG. 2B, each gate line 510 of the light control panel 502 includes a plurality of first bending-line structures 515 that are directly connected in sequence, and each of the plurality of first bending-line structures 515 includes a first wire portion 511, a second wire portion 512, a third wire portion 513, and a fourth wire portion 514 that are directly connected in sequence. As illustrated in FIG. 1B and FIG. 2B, each data line 520 of the light control panel 502 includes a plurality of second bending-line structures 521 that are directly connected in sequence, and each of the plurality of second bending-line structures 521 includes a fifth wire portion 522 and a sixth wire portion 523 that are directly connected in sequence. As illustrated in FIG. 1B and FIG. 2B, each common electrode line 560 of the light control panel 502 includes a plurality of third bending-line structures 561 that are directly connected in sequence, and each of the plurality of third bending-line structures 561 includes a seventh wire portion 562 and an eighth wire portion 563 that are directly connected in sequence.

Figure 3A:
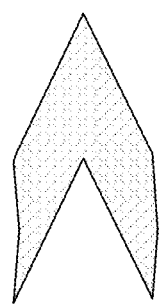
FIG. 3A is a schematic plan view of a light control pixel unit of the array substrate as illustrated in FIG. 2B.
Figure 3B:
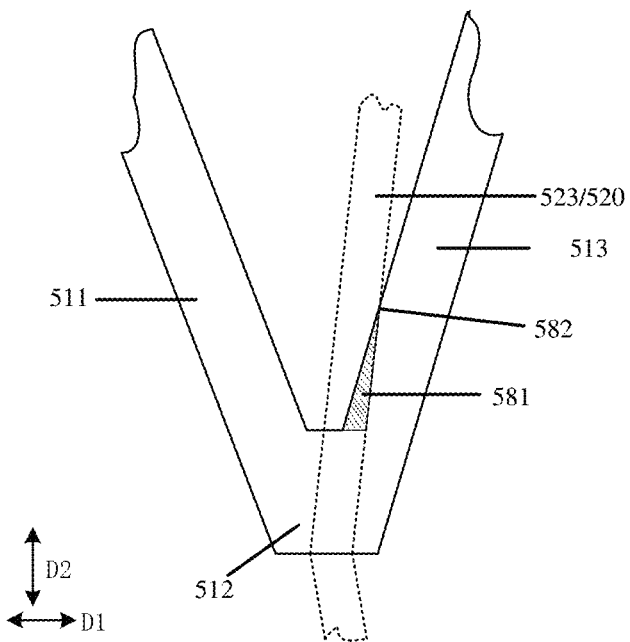
FIG. 3B is an enlarged diagram of a portion, which is located in a first region of the array substrate, of a gate line as illustrated in FIG. 2B.
Figure 3C:
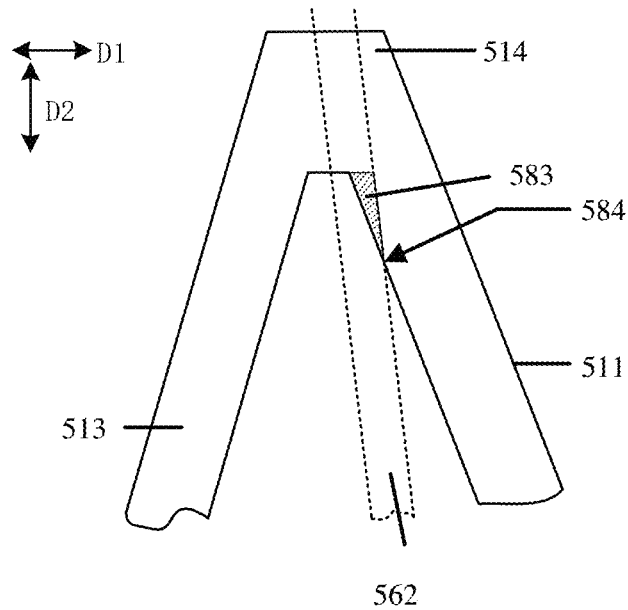
FIG. 3C is an enlarged diagram of a portion, which is located in a second region of the array substrate, of a gate line as illustrated in FIG. 2B.

FIG. 3A is a schematic plan view of a light control pixel unit 530 of the array substrate as illustrated in FIG. 2B; FIG. 3B is an enlarged diagram of the portion, located in a first region RE1 of the array substrate as illustrated in FIG. 2B, of the gate line 510; and FIG. 3C is an enlarged diagram of the portion, located in a second region RE2 of the array substrate as illustrated in FIG. 2B, of the gate line 510.

For example, as illustrated in FIG. 3B, the data line 520 and the gate line 510 are overlapped with each other in the direction perpendicular to the array substrate, and have a first overlapping region 581 (for example, an overlapping triangle). The common electrode line 560 and the gate line 510 are overlapped with each other in the direction perpendicular to the array substrate, and have a second overlapping region 583 (for example, an overlapping triangle).

Figure 3D:
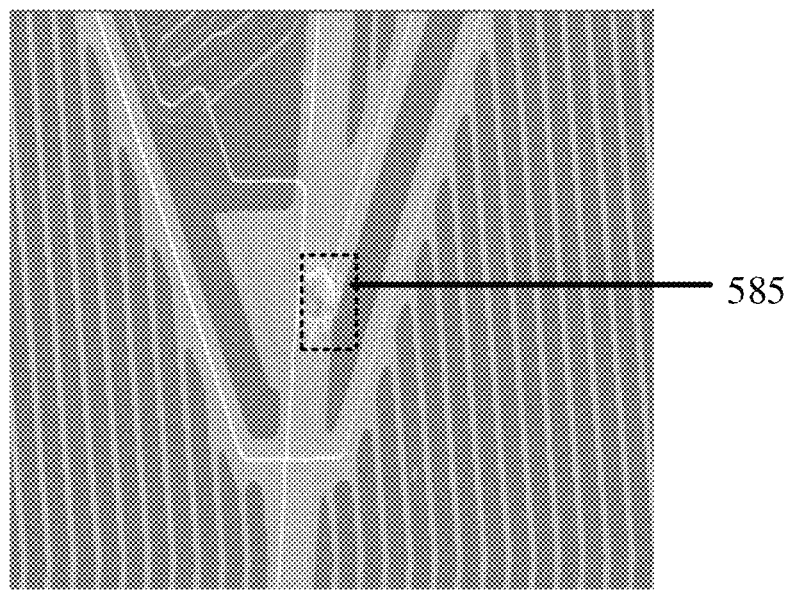
FIG. 3D illustrates a schematic diagram of a short circuit caused by electrostatic breakdown presented in an overlapping region between a data line and a gate line.

For example, when electrostatic discharge occurs in the first overlapping region 581, the insulating layer between the data line 520 and the gate line 510 is penetrated and broken, and at least one of the data line 520 and the gate line 510 melts, as a result, a short circuit is presented between the data line 520 and the gate line 510. For example, because the first position 582 of the first overlapping region 581 (the acute-angle tip of the first overlapping region 581) is the vertex angle with the smallest angle of the overlapping triangle, static electricity is more likely to accumulate at the first position 582, and the short circuit between the data line 520 and the gate line 510 is more likely to occur at the first position 582 of the first overlapping region 581. FIG. 3D illustrates a schematic diagram of a short circuit caused by electrostatic breakdown in a portion 585 of an overlapping region between the data line 520 and the gate line 510.

Figure 3E:
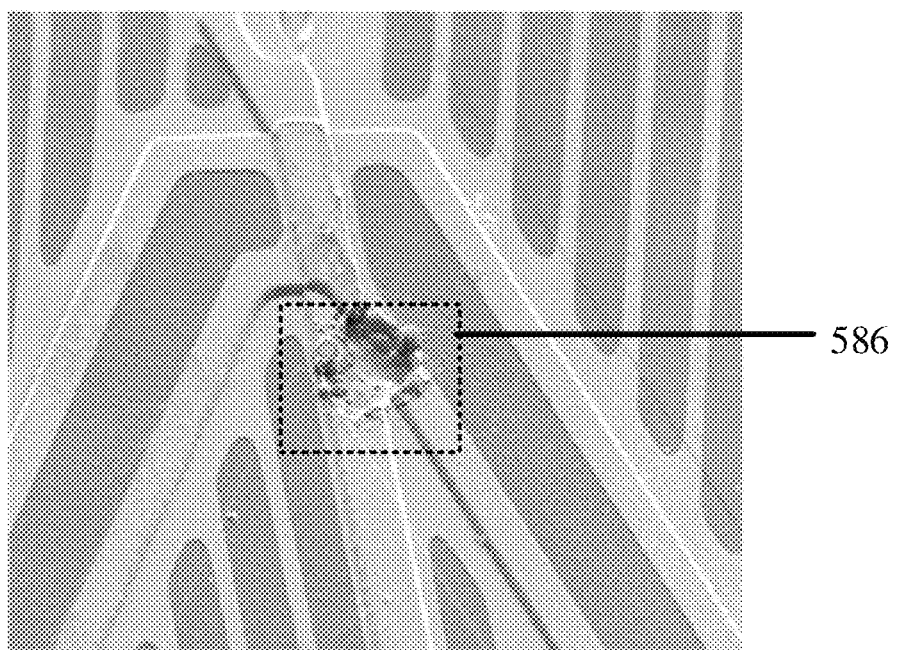
FIG. 3E illustrates a schematic diagram of a short circuit caused by electrostatic breakdown presented in an overlapping region between a common electrode line and a gate line.

For example, when electrostatic discharge occurs in the second overlapping region 583, the insulating layer between the common electrode line 560 and the gate line 510 is penetrated and broken, and at least one of the common electrode line 560 and the gate line 510 melts, as a result, a short circuit is presented between the common electrode line 560 and the gate line 510. For example, because static electricity is more likely to accumulate at the second position 584 of the second overlapping region 583, the short circuit between the common electrode line 560 and the gate line 510 is more likely to occur at the second position 584 (the tip of the second overlapping region 583) of the second overlapping region 583. FIG. 3E illustrates a schematic diagram of a short circuit caused by electrostatic breakdown in a portion 586 of an overlapping region between the common electrode line 560 and the gate line 510.

For example, the short circuit between the data line 520 and the gate line 510 and the short circuit between the common electrode line 560 and the gate line 510 reduce the yield and reliability of the array substrate, and the light control panel and liquid crystal display device which include the array substrate, and therefore, there is an urgent need for an array substrate with the possibility of forming defects caused by electrostatic discharge being reduced.

At least one embodiment of the present disclosure provides an array substrate, a light control panel, and a display device. The array substrate includes a first signal line for a sub-pixel row, and a second signal line for a sub-pixel column The first signal line as a whole extends in a first direction; the second signal line as a whole extends in a second direction that is intersected with the first direction; the first signal line comprises a plurality of bending-line structures directly connected in sequence, and each of the plurality of bending-line structures comprises a first wire portion, a second wire portion and a third wire portion directly connected in sequence; an extension direction of the first wire portion and an extension direction of the third wire portion are both intersected with the first direction and the second direction, and the second wire portion extends along the first direction; a center line, extending along the extension direction of the first wire portion, of the first wire portion is intersected with a center line, extending along an extension direction of the second wire portion, of the second wire portion to form a first angle; the second wire portion comprises a first side and a second side opposite to each other in the second direction, and the first side is located at an inner side of the first angle and the second side is located at an outer side of the first angle; a side of the first wire portion closer to the second signal line is intersected with the first side at a first position of the first side, and a side of the third wire portion closer to the second signal line is intersected with the first side at a second position of the first side; a side, closer to the first wire portion, of an orthographic projection of the second signal line on an electrode layer where the first signal line is located is intersected with the first side at a third position of the first side, and a side, closer to the third wire portion, of the orthographic projection of the second signal line on the electrode layer where the first signal line is located is intersected with the first side at a fourth position of the first side; and a length of a line segment between the first position and the second position of the first side is greater than a length of a line segment between the third position and the fourth position of the first side. For example, the array substrate, the light control panel, and the display device can reduce the possibility of forming defects (for example, short circuit) caused by electrostatic discharge.

Non-limitative descriptions are given to the array substrate provided by the embodiments of the present disclosure in the following with reference to a plurality of examples or embodiments. As described in the following, in case of no conflict, different features in these specific examples or embodiments can be combined so as to obtain new examples, and the new examples or embodiments are also fall within the scope of present disclosure.

Figure 4A:
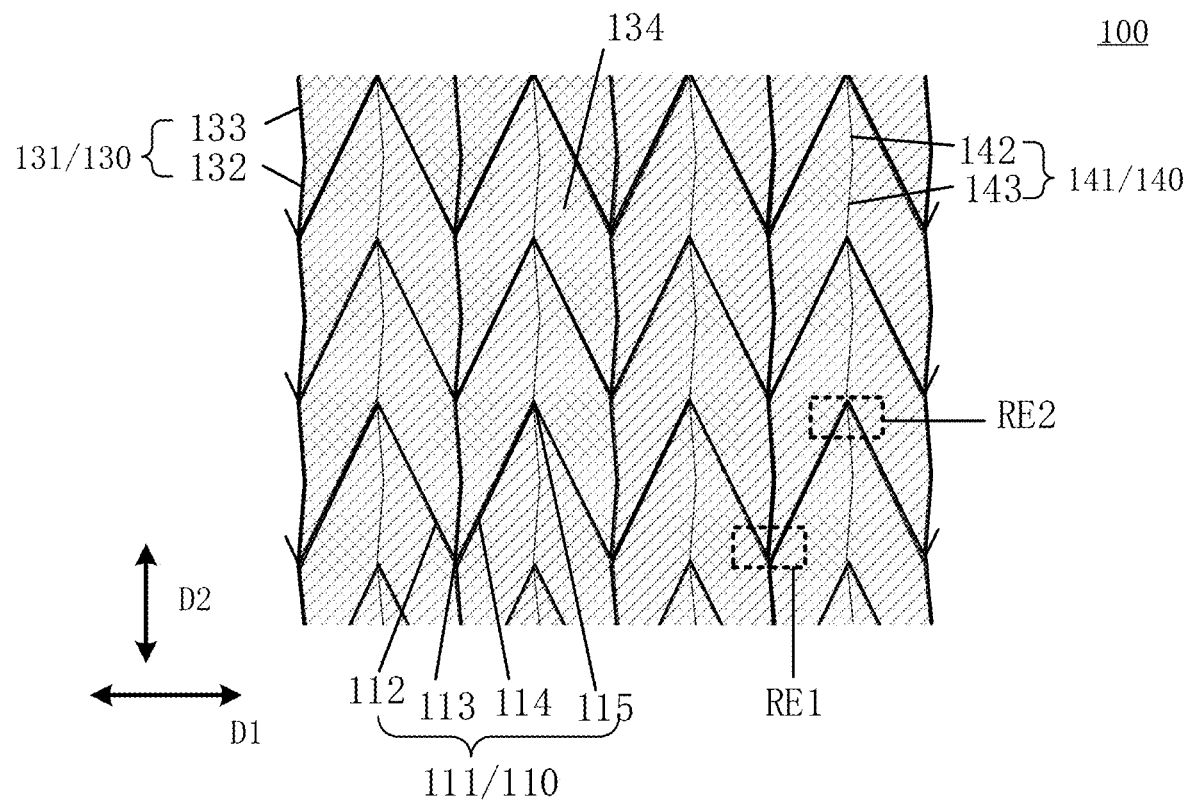
FIG. 4A is a schematic plan view of an array substrate provided by at least one embodiment of the present disclosure.

FIG. 4A is a schematic plan view of an array substrate 100 provided by at least one embodiment of the present disclosure. As illustrated in FIG. 4A, the array substrate 100 includes a first signal line 110 for a sub-pixel row, and a second signal line 130 for a sub-pixel column; the sub-pixel row as a whole extends in a first direction D1, and the sub-pixel column as a whole extends in a second direction D2 that is intersected with the first direction D1. The first direction D1 and the second direction D2 are intersected with each other (for example, perpendicular to each other).

Figure 4B:
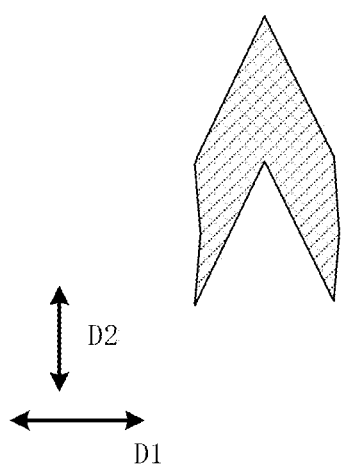
FIG. 4B is a schematic plan view of a light control pixel unit of the array substrate as illustrated in FIG. 4A.

For example, as illustrated in FIG. 4A, the array substrate 100 includes a plurality of first signal lines 110 and a plurality of second signal lines 130. The plurality of first signal lines 110 are intersected with the plurality of second signal lines 130 to form a plurality of light control pixel units 134 arranged in an array. FIG. 4B is a schematic plan view of the light control pixel unit 134 of the array substrate 100 as illustrated in FIG. 4A.

For example, as illustrated in FIG. 4A, light control pixel units 134 located in the same row form a sub-pixel row, in which the sub-pixel row as a whole extends in the first direction D1; the array substrate 100 includes a plurality of rows of sub-pixel rows arranged in the second direction D2; light control pixel units 134 located in the same column form a sub-pixel column, in which the sub-pixel column as a whole extends in the second direction D2, and the array substrate 100 includes a plurality of columns of sub-pixel columns arranged in the first direction D1.

For example, as illustrated in FIG. 4A, the plurality of first signal lines 110 correspond to the plurality of rows of sub-pixel rows, and the plurality of first signal lines 110 are configured to drive corresponding sub-pixel rows. The plurality of second signal lines 130 correspond to the plurality of columns of sub-pixel columns, and the plurality of second signal lines 130 are configured to drive corresponding sub-pixel columns. For example, the first signal line 110 and the second signal line 130 are electrically connected to different signal sources. For example, the first signal line 110 is a gate line and is electrically connected to a gate driving circuit of a display device including the array substrate 100. The second signal line 130 is a data line and is electrically connected to a data driving circuit of the display device including the array substrate 100.

For example, as illustrated in FIG. 4A, each of the plurality of first signal lines 110 as a whole extends in the first direction D1, and each of the plurality of second signal lines 130 as a whole extends in the second direction D2. It should be noted that, each of the plurality of first signal lines 110 as a whole extends in the first direction D1 only defines the extension direction of the first signal line 110 as a whole, and does not mean that wire portions included in the first signal line 110 all parallel to the first direction D1; each of the plurality of second signal lines 130 as a whole extends in the second direction D2 only defines the extension direction of the second signal line 130 as a whole, and does not mean that wire portions included in the second signal line 130 all parallel to the second direction D2.

As illustrated in FIG. 4A, the first signal line 110 (for example, each of the plurality of first signal lines 110) includes a plurality of bending-line structures 111 (first bending-line structure) directly connected in sequence, and each of the plurality of bending-line structures 111 includes a first wire portion 112, a second wire portion 113, a third wire portion 114, and a fourth wire portion 115 that are directly connected in sequence. The extension direction of the first wire portion 112 and the extension direction of the third wire portion 114 are both intersected with the first direction D1 and the second direction D2, and the second wire portion 113 and the fourth wire portion 115 respectively extend along the first direction D1. For example, as illustrated in FIG. 4A, except for the bending-line structure 111 located at the rightmost, the fourth wire portion 115 (an end, away from the first wire portion 112 of each of the plurality of bending-line structures 111, of the fourth wire portion 115) of each of the plurality of bending-line structures 11 is directly connected to a first wire portion 112 (an end, away from the fourth wire portion 114 of another bending-line structures 111, of the first wire portion 112) of another bending-line structure 111 located at the right side of each of the plurality of bending-line structures 111.

For example, the first wire portion 112 the second wire portion 113, the third wire portion 114, and the fourth wire portion 115 are all straight line segments, but at least one embodiment of the present disclosure is not limited thereto. For another example, at least one of the first wire portion 112, the second wire portion 113, the third wire portion 114, and the fourth wire portion 115 is a curved line segment.

For example, as illustrated in FIG. 4A, the second signal line 130 (for example, each of the plurality of second signal lines 130) includes a plurality of second bending-line structures 131 directly connected in sequence, and each of the plurality of second bending-line structures 131 includes a first line segment 132 and a second line segment 133 directly connected in sequence. The extension direction of the first line segment 132 and the extension direction of the second line segment 133 are both intersected with the first direction D1 and the second direction D2. For example, as illustrated in FIG. 4A, except for the second bending-line structure 131 located at the uppermost side, the second line segment 133 (for example, an end, away from the first line segment 132 of each of the plurality of second bending-line structures 131, of the second line segment 133) of each of the plurality of second bending-line structures 131 is directly connected to a first line segment 132 (for example, an end, away from a second line segment 133 of another second bending-line structure 131, of the first line segment 132)of another second bending-line structure 131 located above each of the plurality of second bending-line structures 131. For example, the first line segment 132 and the second line segment 133 are both straight line segments.

For example, as illustrated in FIG. 4A, the array substrate 100 further includes a plurality of third signal lines 140, and each of the plurality of third signal lines 140 as a whole extends along the second direction D2. The third signal line 140 (for example, each of the plurality of third signal lines 140) includes a plurality of third bending-line structures 141 directly connected in sequence, and each of the plurality of third bending-line structures 141 includes a third line segment 142 and a fourth line segment 143 directly connected in sequence, and the extension direction of the third line segment 142 and the extension direction of the fourth line segment 143 are both intersected with the first direction D1 and the second direction D2. For example, as illustrated in FIG. 4A, except for the third bending-line structure 141 located at the lowermost side, the fourth line segment 143 of each of the plurality of third bending-line structures 141 is directly connected to the third line segment 142 of another third bending-line structure 141 located below each of the plurality of third bending-line structures 141. For example, the third signal line 140 is a common electrode line and is configured to receive a common voltage. For example, the third line segment 142 and the fourth line segment 143 are both straight line segments.

Figure 5A:
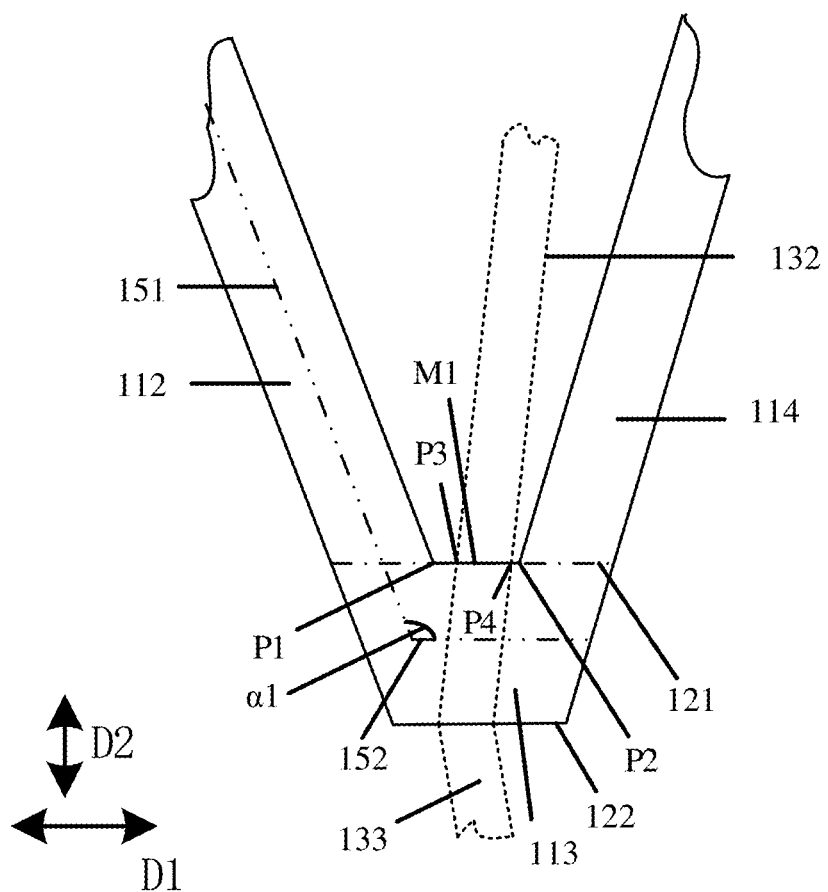
FIG. 5A is a schematic diagram of an example of a portion, located in a first region of the array substrate as illustrated in FIG. 4A, of a first signal line.

FIG. 5A is a schematic diagram of an example of a portion, located in the first region RE1 of the array substrate 100 as illustrated in FIG. 4A, of the first signal line 110. As illustrated in FIG. 5A, a center line 151 of the first wire portion 112 extending along the extension direction of the first wire portion 112 is intersected with a center line 152 of the second wire portion 113 extending along the extension direction of the second wire portion 113 to form a first angle α1. The second wire portion 113 includes a first side 121 and a second side 122 opposite to each other in the second direction D2, and the first side 121 is located at an inner side of the first angle α1 and the second side 122 is located at an outer side of the first angle α1.

As illustrated in FIG. 5A, the side, closer to the second signal line 130 (for example, the first line segment 132 of the second signal line 130), of the first wire portion 112 is intersected with the first side 121 at a first position P1 of the first side 121, and the side, closer to the second signal line 130 (for example, the first line segment 132 of the second signal line 130), of the third wire portion 114 is intersected with the first side 121 at a second position P2 of the first side 121. The side, closer to the first wire portion 112, of the orthographic projection of the second signal line 130 on an electrode layer where the first signal line 110 is located is intersected with the first side 121 at a third position P3 of the first side 121, and the side, closer to the third wire portion 114, of the orthographic projection of the second signal line 130 on the electrode layer where the first signal line 110 is located is intersected with the first side 121 at a fourth position P4 of the first side 121.

As illustrated in FIG. 5A, the length of the line segment between the first position P1 and the second position P2 of the first side 121 is greater than the length of the line segment between the third position P3 and the fourth position P4 of the first side 121. For example, by making the length of the line segment between the first position P1 and the second position P2 of the first side 121 greater than the length of the line segment between the third position P3 and the fourth position P4 of the first side 121, the possibility that both the third position P3 and the fourth position P4 are located between the first position P1 and the second position P2 can be increased, and thus the possibility that the second signal line 130 overlaps with the third wire portion 114 of the first signal line 110 can be reduced, thereby reducing the possibility of forming an overlapping triangle (for example, the overlapping triangle as illustrated in FIG. 3B) between the second signal line 130 and the first signal line 110 and reducing the possibility of forming defects caused by electrostatic discharge (for example, short-circuit defect).

For example, as illustrated in FIG. 5A, the third position P3 and the fourth position P4 are both located between the first position P1 and the second position P2. It should be noted that, the expression that the third position P3 and the fourth position P4 are both located between the first position P1 and the second position P2 includes the case where the third position P3 is coincident with the first position P1 and the fourth position P4 is coincident with the second position P2.

For example, by making both the third position P3 and the fourth position P4 between the first position P1 and the second position P2, it is possible to avoid forming an overlapping triangle (for example, the overlapping triangle as illustrated in FIG. 3B) between the second signal line 130 and the first signal line 110 as well as reducing the possibility of forming defects caused by electrostatic discharge (for example, short-circuit defect).

It should be noted that the third position P3 and the fourth position P4 are not limited to both be located between the first position P1 and the second position P2. For example, in the case where the fourth position P4 is located at the side of the second position P2 away from the first position P1, and the area of the overlapping triangle formed between the second signal line 130 and the first signal line 110 is smaller than the overlapping triangle as illustrated in FIG. 3B, it is also possible to reduce the possibility of forming defects (for example, short-circuit defect between the second signal line 130 and the first signal line 110) caused by electrostatic discharge.

For example, as illustrated in FIG. 4A and FIG. 5A, the first line segment 132 is a portion, between the first wire portion and the second wire portion, of the second signal line 130; and the first line segment 132 and the third wire portion 114 are inclined toward the same direction with respect to the second direction D2. For example, as illustrated in FIG. 4A and FIG. 5A, both the first line segment 132 and the third wire portion 114 are inclined toward the right side with respect to the second direction D2.

Figure 5B:
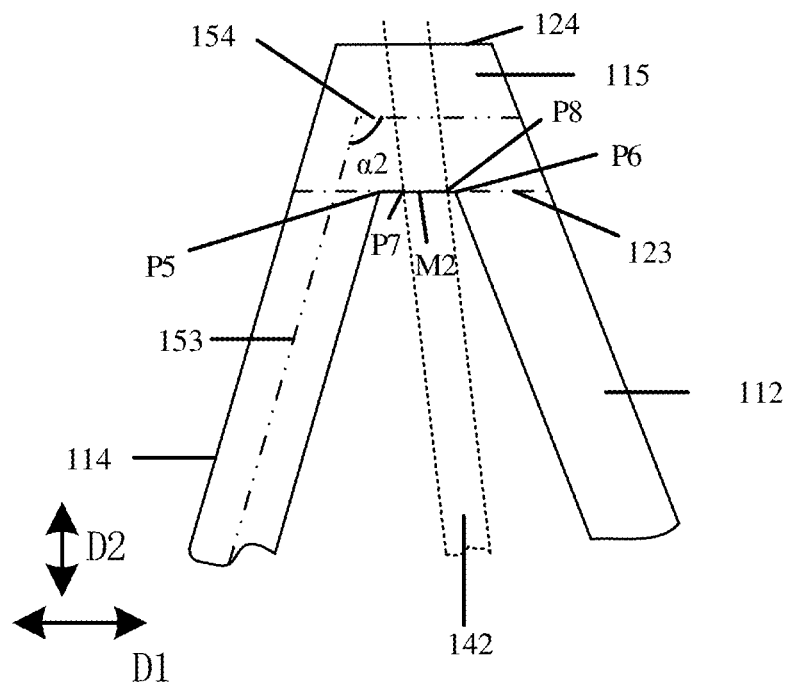
FIG. 5B is a schematic diagram of an example of a portion, located in a second region of the array substrate as illustrated in FIG. 4A, of a first signal line.

FIG. 5B is a schematic diagram of an example of a portion of the first signal line 110 located in the second region RE2 of the array substrate 100 as illustrated in FIG. 4A. As illustrated in FIG. 5B, a center line 153, extending along the extension direction of the third wire portion 114, of the third wire portion 114 is intersected with a center line 154, extending along the extension direction of the fourth wire portion 115, of the fourth wire portion 115 to form a second angle α2. The fourth wire portion 115 includes a third side 123 and a fourth side 124 which are opposite to each other in the second direction D2, and the third side 123 is located at an inner side of the second angle α2 and the fourth side 124 is located at an outer side of the second angle α2.

As illustrated in FIG. 5B, the side, closer to the third signal line 140 (for example, the third line segment 142 of the third signal line 140), of the third wire portion 114 is intersected with the third side 123 at a fifth position P5 of the third side 123, and the side, closer to the third signal line 140 (for example, the third line segment 142 of the third signal line 140), of the first wire portion 112 is intersected with the third side 123 at a sixth position P6 of the third side 123. The side, closer to the third wire portion 114, of an orthographic projection of the third signal line 140 on an electrode layer where the first signal line 110 is located is intersected with the third side 123 at a seventh position P7 of the third side 123, and the side, closer to the first wire portion 112, of the orthographic projection of the third signal line 140 on the electrode layer where the first signal line 110 is located is intersected with the third side 123 at an eighth position P8 of the third side 123.

As illustrated in FIG. 5B, the length of the line segment between the fifth position P5 and the sixth position P6 of the third side 123 is greater than the length of the line segment between the seventh position P7 and the eighth position P8 of the third side 123. For example, by making the length of the line segment between the fifth position P5 and the sixth position P6 of the third side 123 greater than the length of the line segment between the seventh position P7 and the eighth position P8 of the third side 123, the possibility that both the seventh position P7 and the eighth position P8 are located between the fifth position P5 and the sixth position P6 can be increased, and thus the possibility that the third signal line 140 overlaps with the first wire portion 112 of the first signal line 110 can be reduced, thereby reducing the possibility of forming an overlapping triangle (for example, the overlapping triangle as illustrated in FIG. 3C) between the third signal line 140 and the first signal line 110 and reducing the possibility of forming defects caused by electrostatic discharge (for example, short-circuit defect).

For example, as illustrated in FIG. 5B, the seventh position P7 and the eighth position P8 are both located between the fifth position P5 and the sixth position P6. It should be noted that, the expression that the seventh position P7 and the eighth position P8 are both located between the fifth position P5 and the sixth position P6 includes the case where the seventh position P7 is coincident with the fifth position P5 and the eight position P8 is coincident with the sixth position P6.

For example, by making both the seventh position P7 and the eighth position P8 between the fifth position P5 and the sixth position P6, it is possible to avoid forming an overlapping triangle (for example, the overlapping triangle as illustrated in FIG. 3C) between the third signal line 140 and the first signal line 110 as well as reducing the possibility of forming defects (for example, short-circuit defect between the third signal line 140 and the first signal line 110) caused by electrostatic discharge.

In one example, the third position P3 is between a first midpoint M1 and the first position P1, and the seventh position P7 is between a second midpoint M2 and the fifth position P5. In this case, the first midpoint M1 is a midpoint of the line segment between the first position P1 and the second position P2 of the first side 121, and the second midpoint M2 is a midpoint of the line segment between the fifth position P5 and the sixth position P6 of the third side 123. The following is an exemplary description with reference to FIG. 5A to FIG. 5D.

Figure 5C:
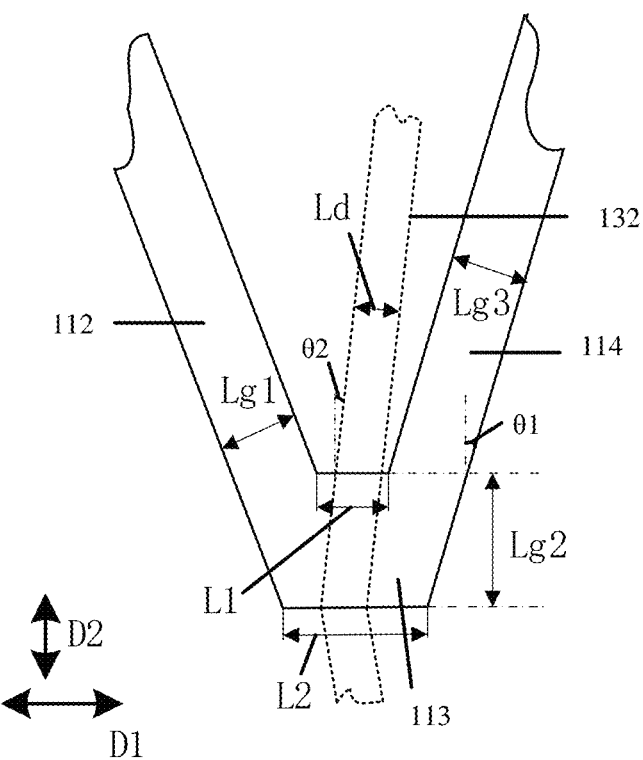
FIG. 5C is another schematic diagram of an example of the portion of the first signal line as illustrated in FIG. 5A.
Figure 5D:
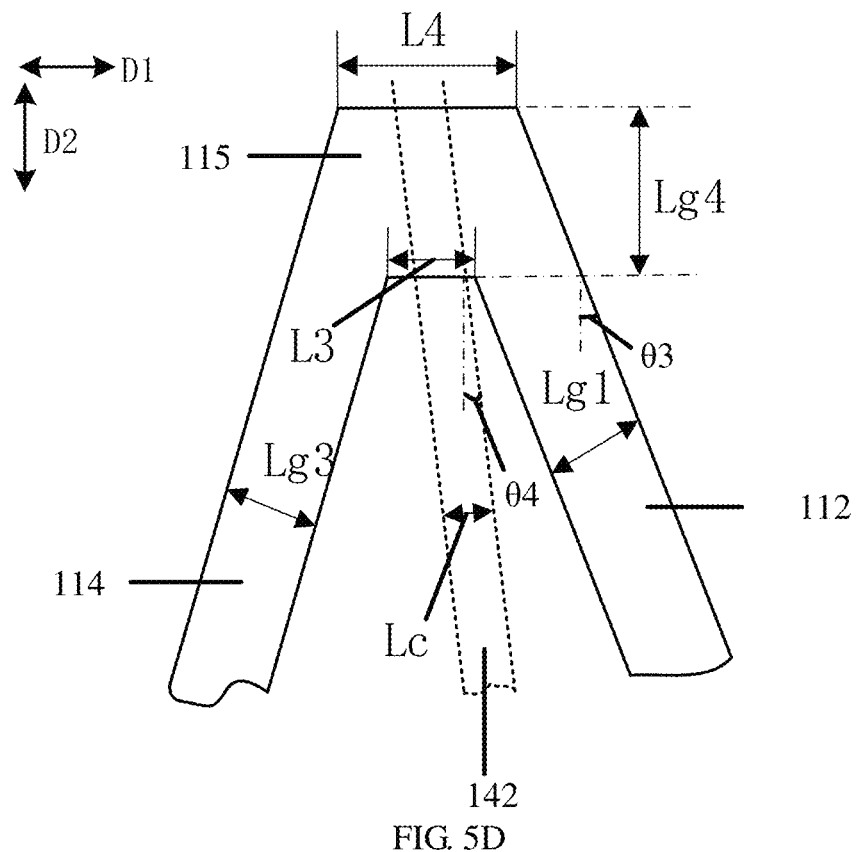
FIG. 5D is another schematic diagram of an example of the portion of the first signal line as illustrated in FIG. 5B.

FIG. 5C is another schematic diagram of an example of the portion of the first signal line 110 as illustrated in FIG. 5A, and FIG. 5D is another schematic diagram of an example of the portion of the first signal line 110 as illustrated in FIG. 5B. As illustrated in FIG. 4A and FIG. 5A to FIG. 5D, an inclination angle θ1 of the third wire portion 114 relative to the second direction D2 is greater than three times an inclination angle θ2 of the first line segment 132 relative to the second direction D2 and smaller than four times the inclination angle θ2 of the first line segment 132 relative to the second direction D2; and an inclination angle θ3 of the first wire portion 112 relative to the second direction D2 is greater than three times an inclination angle θ4 of the third line segment 142 relative to the second direction D2 and smaller than four times the inclination angle θ4 of the third line segment 142 relative to the second direction D2 (the inclination angles θ1 to θ4 here are acute angles and positive values). The width Lg1 of the first wire portion 112 is equal to the width Lg3 of the third wire portion 114; the width Lg1 of the first wire portion 112 is greater than twice the width Ld of the second signal line 130 and smaller than three times the width Ld of the second signal line 130; the width Lg1 of the first wire portion 112 is greater than three times the width Lc of the third signal line 140 and smaller than four times the width Lc of the third signal line 140; the width Ld of the second signal line 130 is greater than the width Lc of the third signal line 140; the width Lg1 of the first wire portion 112 is smaller than the length L2 of the second side 122 and greater than the length L1 of the line segment between the first position P1 and the second position P2 of the first side 121; and the width Lg1 of the first wire portion 112 is smaller than the length L4 of the fourth side 124 and greater than the length L3 of the line segment between the fifth position P5 and the sixth position P6 of the third side 123.

For example, the length L1 of the line segment between the first position P1 and the second position P2 of the first side 121 is greater than the length L3 of the line segment between the fifth position P5 and the sixth position P6 of the third side 123. For example, the length L2 of the second side 122 is greater than the length L4 of the fourth side 124. For example, the inclination angle θ1 of the third wire portion 114 relative to the second direction D2 is equal to the inclination angle θ3 of the first wire portion 112 relative to the second direction D2; and the inclination angle θ2 of the first line segment 132 relative to the second direction D2 is equal to the inclination angle θ4 of the third line segment 142 relative to the second direction D2. For example, the width Lg2 of the second wire portion 113 is greater than the width Lg1 of the first wire portion 112 and smaller than twice the width Lg1 of the first wire portion 112; and the width Lg4 of the fourth wire portion 115 is greater than the width Lg2 of the second wire portion 113.

It should be noted that the width of a wire portion refers to the width of the wire portion in a direction perpendicular to the extension direction of the wire portion. For example, the width of the second wire portion 113 refers to a width of the second wire portion 113 in the second direction D2, and the width of the fourth wire portion 115 refers to a width of the fourth wire portion 115 in the second direction D2.

In the example as illustrated in FIG. 5A to FIG. 5D, Lg1=Lg3=20 microns, Ld=8 microns, Lc=6 microns, θ1=θ3=27 degrees, θ2=θ4=7 degrees; L1=13 microns, L2=26 microns, L3=11 microns, and L4=23 microns. In the example as illustrated in FIG. 5A to FIG. 5D, for example, Lg2=31.3 microns; and Lg4=32.3 microns.

Figure 6A:
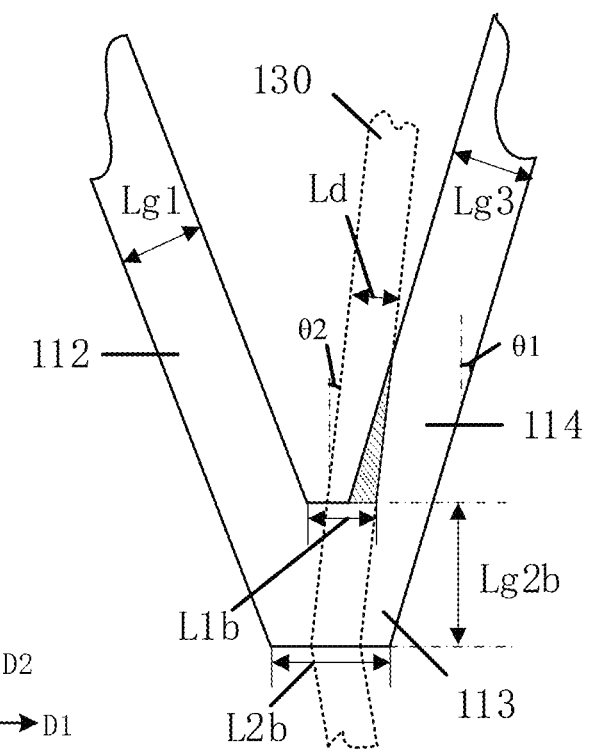
FIG. 6A is a schematic diagram of an overlapping triangle between a first signal line and a second signal line.
Figure 6B:
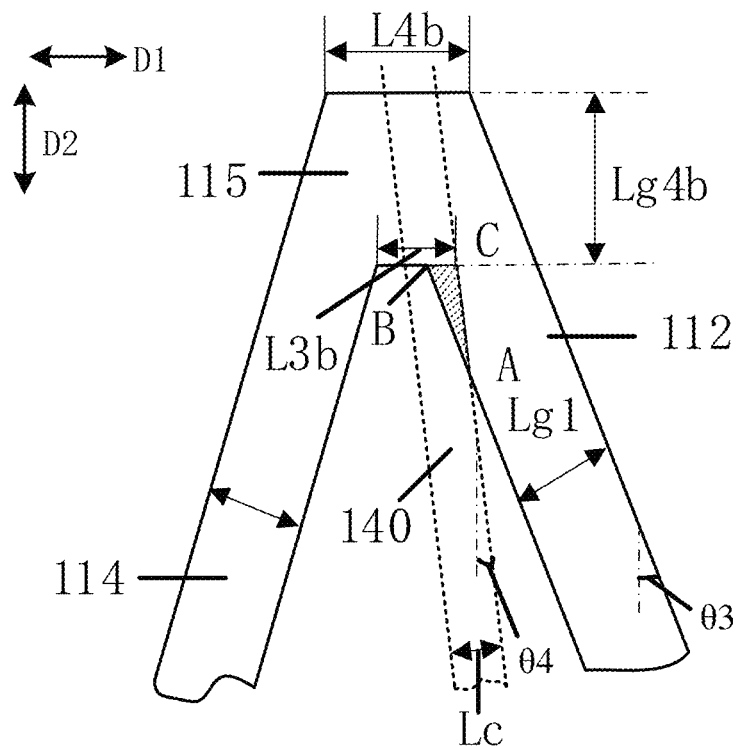
FIG. 6B is a schematic diagram of an overlapping triangle between a first signal line and a third signal line.

The design idea of how to eliminate or reduce the overlapping triangle between the first signal line 110 and the second signal line 130 in FIG. 6A and the overlapping triangle between the first signal line 110 and the third signal line 140 in FIG. 6B (to obtain the structures of FIG. 5A to FIG. 5D) by resetting L1b, L2b, L3b, and L4b in FIG. 6A and FIG. 6B (that is, set L1b, L2b, L3b, and L4b respectively to be L1, L2, L3 and L4) will be exemplified with reference to FIG. 7A to FIG. 7D and FIG. 8A to FIG. 8D.

FIG. 6A is a schematic diagram of the overlapping triangle between the first signal line 110 (for example, the third wire portion 114 of the first signal line 110) and the second signal line 130; and FIG. 6B is a schematic diagram of the overlapping triangle between the first signal line 110 and the third signal line 140. In the examples of FIG. 6A and FIG. 6B, Lg1=Lg3=20 microns, Ld=8 microns, Lc=6 microns, θ1=θ3=27 degrees, θ2=θ4=7 degrees; and L1b=5 microns, L2b=18 microns, L3b=5 microns, L4b=17 microns.

It should be noted that the overlapping triangle between the first signal line 110 and the second signal line 130 refers to an overlapping triangle formed by the orthographic projection of the second signal line 130 on the electrode layer where the first signal line 110 is located and the first signal line 110; and the overlapping triangle between the first signal line 110 and the third signal line 140 refers to an overlapping triangle formed by the orthographic projection of the third signal line 140 on the electrode layer where the first signal line 110 is located and the first signal line 110.

It should be noted that the design idea provided by at least one embodiment of the present disclosure is not limited to eliminating overlapping triangles in the examples of FIG. 6A and FIG. 6B. When the values of Lg1, Lg3, Ld, Lc, and θ1-θ4 are changed, a similar design idea can be used to set L1 to L4 to eliminate or reduce the overlapping triangle between the first signal line 110 and the second signal line 130 and the overlapping triangle between the first signal line 110 and the third signal line 140.

A design idea of how to eliminate or reduce the overlapping triangle between the first signal line 110 (for example, the third wire portion 114 of the first signal line 110) and the second signal line 130 will be exemplified with reference to FIG. 7A to FIG. 7D (that is, by parallel shifting the third wire portion 114 of the first signal line 110 toward the side of the third wire portion 114 away from the second signal line 130).

Figure 7A:
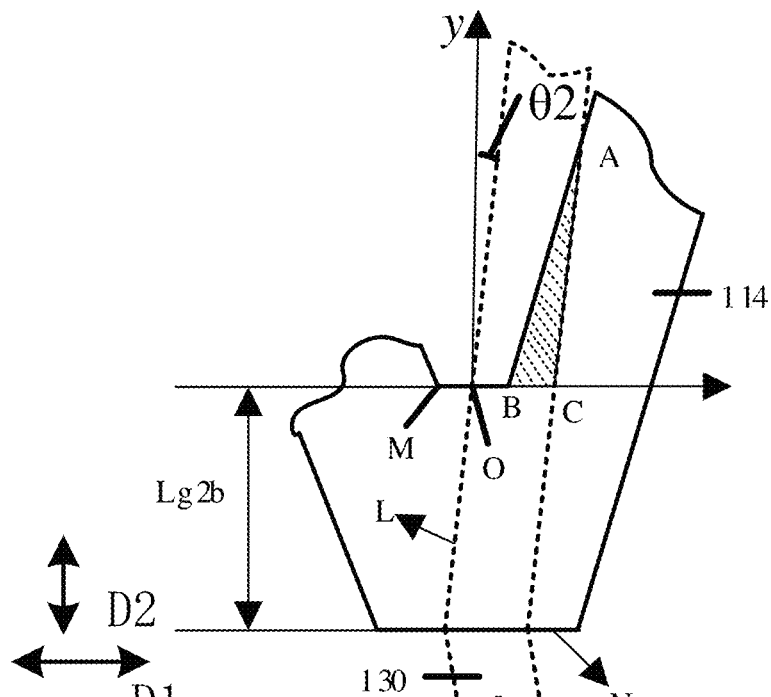
FIG. 7A is a simplified schematic diagram of the overlapping triangle between the first signal line and the second signal line as illustrated in FIG. 6A in the case where the second signal line has no alignment error with respect to the first signal line.
Figure 7B:
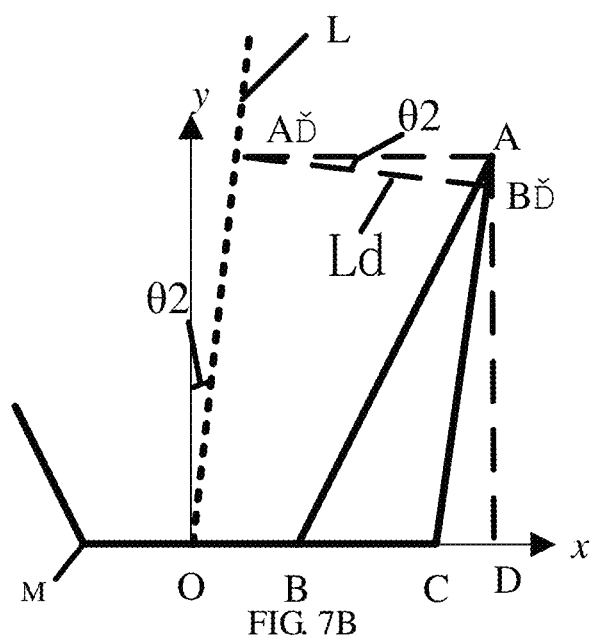
FIG. 7B is an equivalent schematic diagram of the overlapping triangle between the first signal line and the second signal line as illustrated in FIG. 6A in the case where the second signal line has no alignment error with respect to the first signal line.

FIG. 7A is a simplified schematic diagram of the overlapping triangle between the first signal line 110 and the second signal line 130 as illustrated in FIG. 6A in the case where the second signal line 130 has no alignment error with respect to the first signal line 110. FIG. 7B is an equivalent schematic diagram of the overlapping triangle ΔABC between the first signal line 110 and the second signal line 130 as illustrated in FIG. 6A in the case where the second signal line 130 has no alignment error with respect to the first signal line 110. As illustrated in FIG. 7A and FIG. 7B, assuming that there is no alignment error during the manufacturing process, the left boundary L of the second signal line 130 passes through the midpoint of the line segment MB (the length of the line segment MB is equal to L1b), and the origin O of cartesian coordinate system is located at the midpoint of the line segment MB.

Figure 7C:
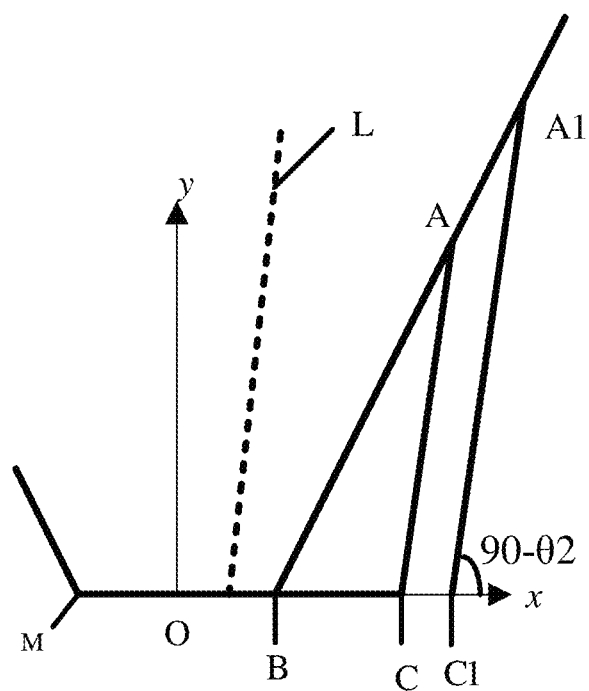
FIG. 7C is an equivalent schematic diagram of an overlapping triangle between the first signal line and a shifted second signal line in the case where the second signal line has a horizontal alignment error with respect to the first signal line but has no vertical alignment error with respect to the first signal line.
Figure 7D:
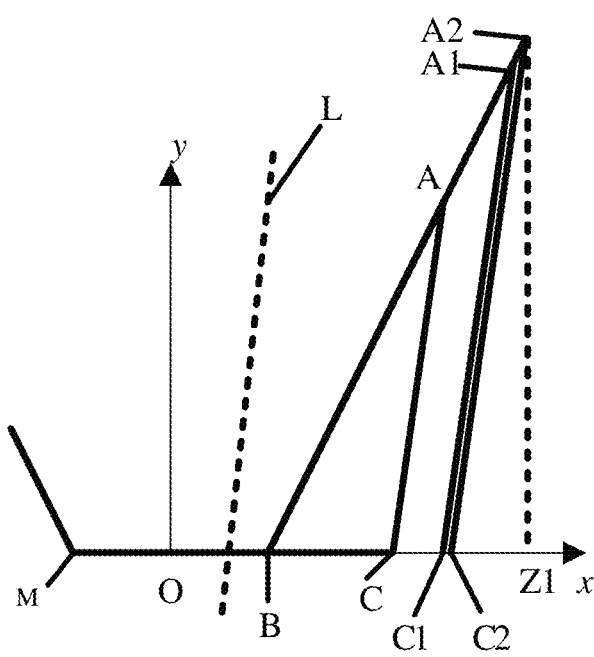
FIG. 7D is an equivalent schematic diagram of an overlapping triangle between the first signal line and the shifted second signal line in the case where the second signal line has a horizontal alignment error and a vertical alignment error with respect to the first signal line.

FIG. 7C is an equivalent schematic diagram of an overlapping triangle ΔA1BC1 between the first signal line 110 and a shifted second signal line 130 (shifted relative to the second signal line as illustrated in FIG. 6A) in the case where the second signal line 130 has a horizontal alignment error (that is, alignment error along the x-axis) with respect to the first signal line 110 but has no vertical alignment error (that is, alignment error along the y-axis) with respect to the first signal line 110; and FIG. 7D is an equivalent schematic diagram of an overlapping triangle ΔA2BC2 between the first signal line 110 and the shifted second signal line 130 (shifted relative to the second signal line as illustrated in FIG. 6A) in the case where the second signal line 130 has a horizontal alignment error and a vertical alignment error with respect to the first signal line 110. For example, the absolute value of the maximum horizontal alignment error of the second signal line 130 relative to the first signal line 110 is DX, and the absolute value of the maximum vertical alignment error of the second signal line 130 relative to the first signal line 110 is DY. For example, DX=DY=1.5 microns. As illustrated in FIG. 7B to FIG. 7D, when the second signal line 130 is parallel shifted to the right by DX and downward by DY relative to the first signal line 110, the area of the overlapping triangle between the first signal line 110 and the second signal line 130 is largest. Therefore, in order to eliminate the overlapping triangle between the first signal line 110 and the second signal line 130 with better effect, the design may be based on the overlapping triangle ΔA2BC2 as illustrated in FIG. 7D.

For example, the following design idea may be adopted to eliminate the overlapping triangle as illustrated in FIG. 7D.

Firstly, the equation of the straight line where the line segment A2C2 in the overlapping triangle ΔA2BC2 illustrated in FIG. 7D is obtained. The specific method is as follows. (1) In the case where the second signal line 130 has no alignment error with respect to the first signal line 110 (see FIG. 7B), the length of the line segment BC in the overlapping triangle ΔABC is obtained as L_BC=L_OC−L_OB=L_A'A−L_OB=Ld/sin(90−θ2)−L_ MB/2. (2) In the case where the second signal line 130 has an alignment error DX in the horizontal direction relative to the first signal line 110 but has no vertical error relative to the first signal line 110 (see FIG. 7C), the length of the line segment BC1 in the overlapping triangle ΔA1BC1 is obtained as L_BC1=L_BC+L_CC1=L_BC+DX=Ld/sin(90−θ2)−L_MB/2+DX. For example, L_BC1=8/sin(83)−2.5+1.5=7.06 microns. (3) The equation of the straight line where the line segment A1C1 is located is obtained as y_A1C1=(x−L_OC1)tan(90−θ2)=(x−L_BC1−L_OB)tan(90−θ2)=(x−L_BC1−L_MB/2)tan(90−θ2). (4) In the case where the second signal line 130 has an alignment error DX in the horizontal direction and an alignment error DY in the vertical direction relative to the first signal line 110 (see FIG. 7F), the equation of the straight line where the line segment A2C2 in the overlapping triangle ΔA2BC2 is located is obtained as y_A2C2=(x−L_BC1−L_MB/2)tan(90−θ2)−DY=(x−7.06−2.5)tan(83°)−1.5=(x−9.56)tan(83°)−1.5. It should be noted that L_XX represents the length of the line segment XX. For example, L_CC1 represents the length of the line segment CC1.

Secondly, the length of the line segment MC2 is obtained as L_MC2=L_MO+L_OC2=L_MB/2+DY/tan(90−θ2)+L_BC1+L_MB/2. For example, L_MC2=2.5+1.5/tan(83)+7.06+2.5=12.244.

Thirdly, L1 and L2 are set based on L_MC2; for example, L1=L_MC2; for example, L1 can be slightly greater than L_MC2 to eliminate the overlapping triangle with better effect; in this case, L1=13 microns. For example, L2=L2b−L1b+L1=18−5+13=26 microns.

A design idea of how to eliminate or reduce the overlapping triangle between the first signal line 110 (for example, the first wire portion 112 of the first signal line 110) and the third signal line 140 will be exemplified with reference to FIG. 8A to FIG. 8D (that is, by parallel shifting the first wire portion 112 of the first signal line 110 toward the side of the first wire portion 112 away from the third signal line 140). The design idea of eliminating the overlapping triangle or reducing the area of the overlapping triangle between the first signal line 110 and the third signal line 140 is similar to the design idea of eliminating the overlapping triangle or reducing the area of the overlapping triangle between the first signal line 110 and the second signal line 130 described in FIG. 7A to FIG. 7D, and no further descriptions will be given for the repeated content.

Figure 8A:
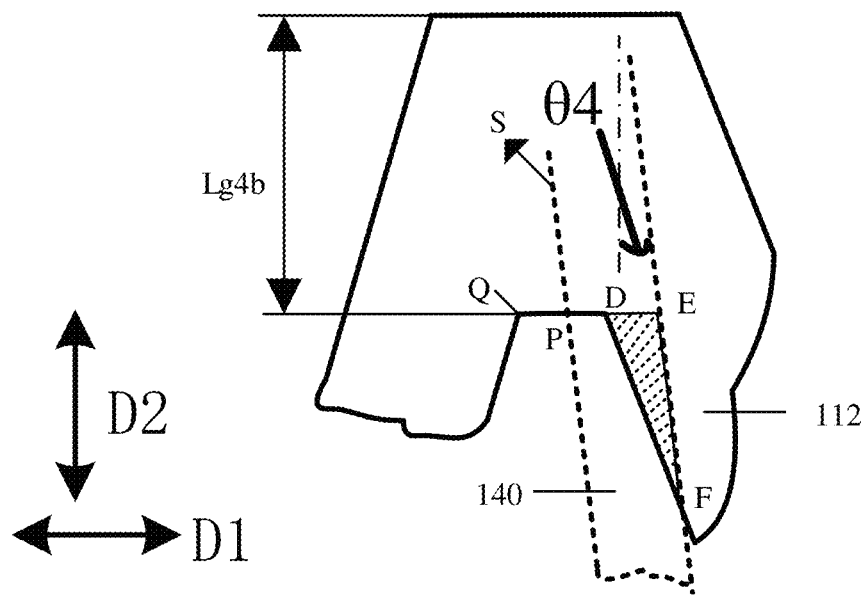
FIG. 8A is a simplified schematic diagram of an overlapping triangle between the first signal line and the third signal line as illustrated in FIG. 6B in the case where the third signal line has no alignment error with respect to the first signal line.
Figure 8B:
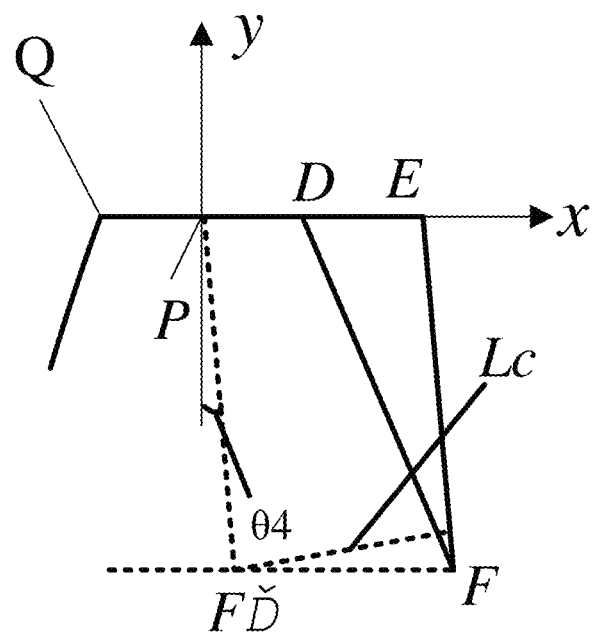
FIG. 8B is an equivalent schematic diagram of the overlapping triangle between the first signal line and the third signal line as illustrated in FIG. 6B in the case where the third signal line has no alignment error with respect to the first signal line.

FIG. 8A is a simplified schematic diagram of the overlapping triangle between the first signal line 110 and the third signal line 140 as illustrated in FIG. 6B in the case where the third signal line 140 has no alignment error with respect to the first signal line 110. FIG. 8B is an equivalent schematic diagram of the overlapping triangle ΔFDE between the first signal line 110 and the third signal line 140 as illustrated in FIG. 6B in the case where the third signal line 140 has no alignment error with respect to the first signal line 110. As illustrated in FIG. 8A and FIG. 8B, assuming that there is no alignment error during the manufacturing process, the left boundary S of the third signal line 140 passes through the midpoint of the line segment QD, and the origin P of cartesian coordinate system is located at the midpoint of the line segment QD. In this case, the length of the line segment QD is equal to L3b.

Figure 8C:
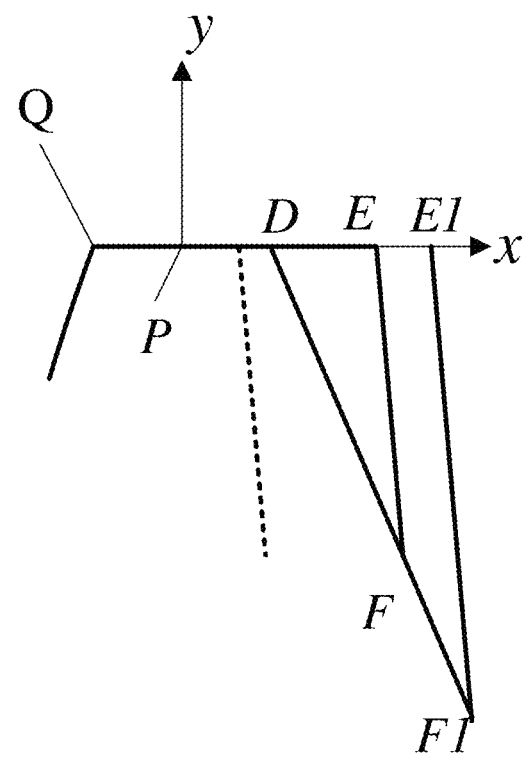
FIG. 8C is an equivalent schematic diagram of an overlapping triangle between the first signal line and a shifted third signal line in the case where the third signal line has a horizontal alignment error with respect to the first signal line but has no vertical alignment error with respect to the first signal line.
Figure 8D:
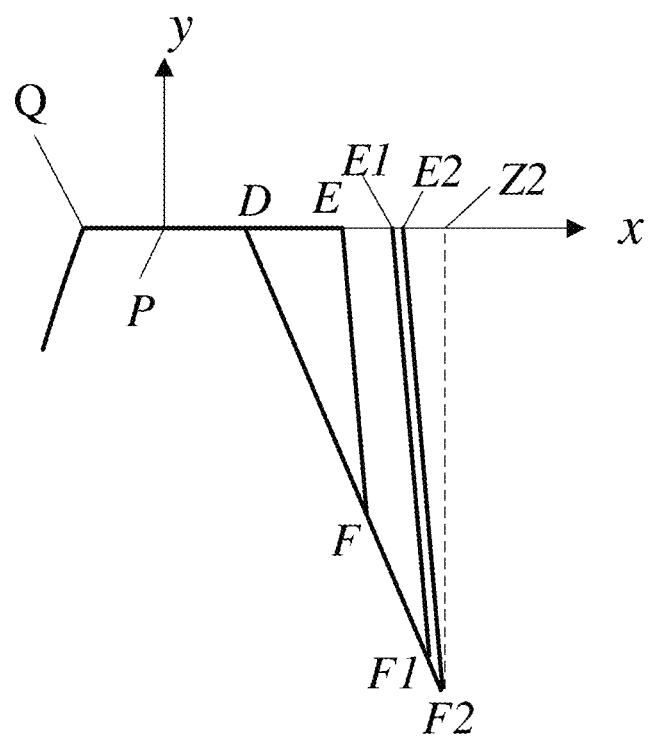
FIG. 8D is an equivalent schematic diagram of an overlapping triangle between the first signal line and the shifted third signal line in the case where the third signal line has a horizontal alignment error and a vertical alignment error with respect to the first signal line.

FIG. 8C is an equivalent schematic diagram of an overlapping triangle ΔF1DE1 between the first signal line 110 and a shifted third signal line 140 (shifted relative to the third signal line as illustrated in FIG. 6B) in the case where the third signal line 140 has a horizontal alignment error (that is, alignment error along the x-axis) with respect to the first signal line 110 but has no vertical alignment error (that is, alignment error along the y-axis) with respect to the first signal line 110; and FIG. 8D is an equivalent schematic diagram of an overlapping triangle ΔF2DE2 between the first signal line 110 and the shifted third signal line 140 (shifted relative to the third signal line as illustrated in FIG. 6B) in the case where the third signal line 140 has a horizontal alignment error and a vertical alignment error with respect to the first signal line 110. For example, the absolute value of the maximum horizontal alignment error of the third signal line 140 relative to the first signal line 110 is DX, and the absolute value of the maximum vertical alignment error of the third signal line 140 relative to the first signal line 110 is DY. For example, DX=DY=1.5 microns. As illustrated in FIG. 8B to FIG. 8D, when the third signal line 140 is parallel shifted to the right by DX and upward by DY relative to the first signal line 110, the area of the overlapping triangle between the first signal line 110 and the third signal line 140 is largest. Therefore, in order to eliminate the overlapping triangle between the first signal line 110 and the third signal line 140 with better effect, the design may be based on the overlapping triangle ΔF2DE2 illustrated in FIG. 8D.

For example, the following design idea may be adopted to eliminate the overlapping triangle as illustrated in FIG. 8D.

Firstly, the equation of the straight line where the line segment F2E2 in the overlapping triangle ΔF2DE2 illustrated in FIG. 8D is obtained. The specific method is as follows. (1) In the case where the third signal line 140 has no alignment error with respect to the first signal line 110 (see FIG. 8B), the length of the line segment DE in the overlapping triangle ΔFDE is obtained as L_DE=L_PE−L_PD=L_F'F−L_PD=Lc/sin(90−θ4)−L_QD/2. (2) In the case where the third signal line 140 has an alignment error DX in the horizontal direction relative to the first signal line 110 but has no vertical error relative to the first signal line 110 (see FIG. 8C), the length of the line segment DE1 in the overlapping triangle ΔF1DE1 is obtained as L_DE1=L_DE+L_EE1=L_DE+DX=Lc/sin(90−θ4)−L_QD/2+DX. For example, L_DE1=6/sin(83)−2.5+1.5=5.05 microns. (3) The equation of the straight line where the line segment F1E1 is located is obtained as y_F1E1=(x−L_PE1)tan(90+θ4)=(x−L_DE1−L_PD)tan(90+θ4)=(x−L_DE1−L_QD/2)tan(90+θ4). (4) In the case where the third signal line 140 has an alignment error DX in the horizontal direction and an alignment error DY in the vertical direction relative to the first signal line 110 (see FIG. 7F), the equation y_F2E2 of the straight line where the line segment F2E2 in the overlapping triangle ΔF2DE2 is located is obtained by using the following derivation process.

$$y\_F2E2 = (x - -L\_DE1 - L\_QD/2)\tan(90 + \theta 4) + DY$$
$$= (x - 5.05 - 2.5)\tan(97°) + 1.5$$
$$= (x - 7.55)\tan(97°) + 1.5.$$

In addition, the following derivation process is used to obtain the length of line segment QE2.

$$L\_QE2 = L\_QP + L\_PE2$$
$$= L\_QD/2 - DY/\tan(90 + \theta 4) + L\_DE1 + L\_QD/2.$$

For example, L__QE2=2.5−1.5/tan(97)+5.05+2.5=10.234.

Thirdly, L3 and L4 are set based on L_QE2; for example, L3=L_QE2; for example, L3 can be slightly greater than L_QE2 to eliminate the overlapping triangle with better effect; in this case, L3=11 microns. Lastly, L4=L4b−L3b+L3=17−5+11=23 microns.

In summary, by parallel shifting the third wire portion 114 of the first signal line 110 away from the second signal line 130 and parallel shifting the first wire portion 112 of the first signal line 110 away from the third signal line 140, L1b, L2b, L3b, and L4b illustrated in FIG. 6A and FIG. 6B can be set to 13 microns, 26 microns, 11 microns, and 23 microns, respectively, thereby eliminating the overlapping triangle between the first signal line 110 and the second signal lines 130 or reducing the area of the overlapping triangle between the first signal line 110 and the second signal lines 130, eliminating the overlapping triangle between the first signal line 110 and the third signal line 140 or reducing the area of the overlapping triangle between the first signal line 110 and the third signal line 140, and suppressing defects caused by electrostatic discharge (short-circuit defect).

For example, in one example, the fourth position P4 may be coincident with the second position P2; and the eighth position P8 may be coincident with the sixth position P6, but the embodiments of the present disclosure are not limited thereto. For example, the fourth position P4 is close to but not coincident with the second position P2; and the eighth position P8 is close to but not coincident with the sixth position P6.

In another example, the third position P3 is located between the first midpoint M1 and the second position P2; the seventh position P7 is located between the second midpoint M2 and the eighth position P8; the orthographic projection of the intersection point of the side, closer to the first wire portion 112, of the second signal line 130 (for example, the first line segment 132 of the second signal line 130) and the second side 122 on the first side 121 is located at the side of the first midpoint M1 away from the third position P3; the orthographic projection of the intersection point of the side, closer to the third wire portion 114, of the third signal line 140 (for example, the third line segment 142 of the third signal line 140) and the fourth side 124 on the third side 123 is located the side of the second midpoint M2 away from the seventh position P7. For example, the width of the second wire portion 113 and the width of the fourth wire portion 115 are both greater than the width of the first wire portion 112; the width of the first wire portion 112 is, for example, equal to the width of the third wire portion 114. The following is an exemplary description with reference to FIG. 9A to FIG. 9D. It should be noted that the orthographic projection of a point on a side refers to the intersection point of the side and a line that is perpendicular to the side and passes the point.

Figure 9A:
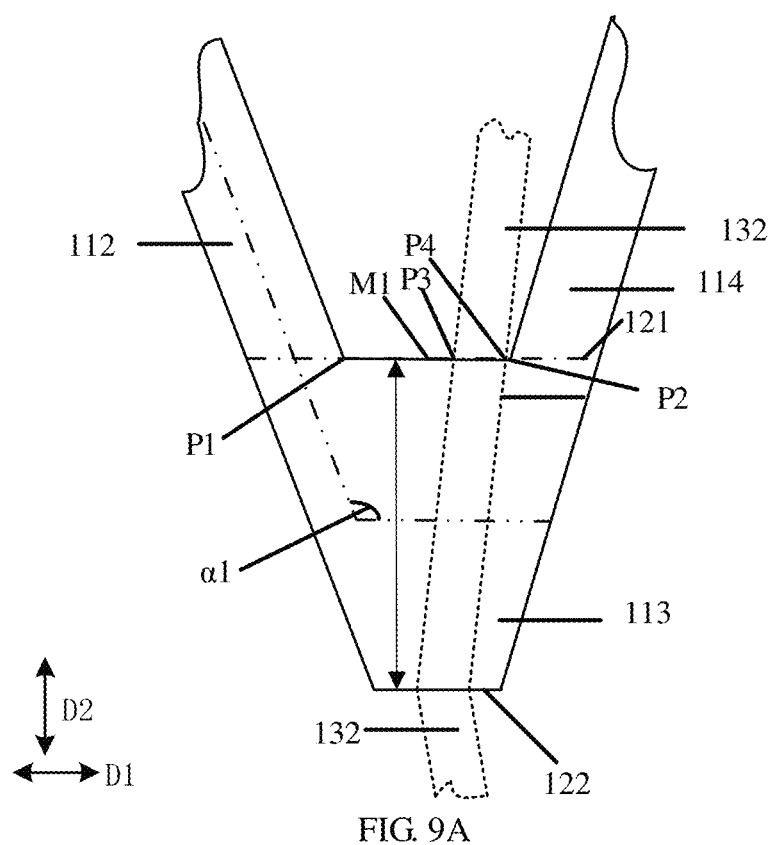
FIG. 9A is a schematic diagram of another example of a portion, located in the first region of the array substrate as illustrated in FIG. 4A, of the first signal line.
Figure 9B:
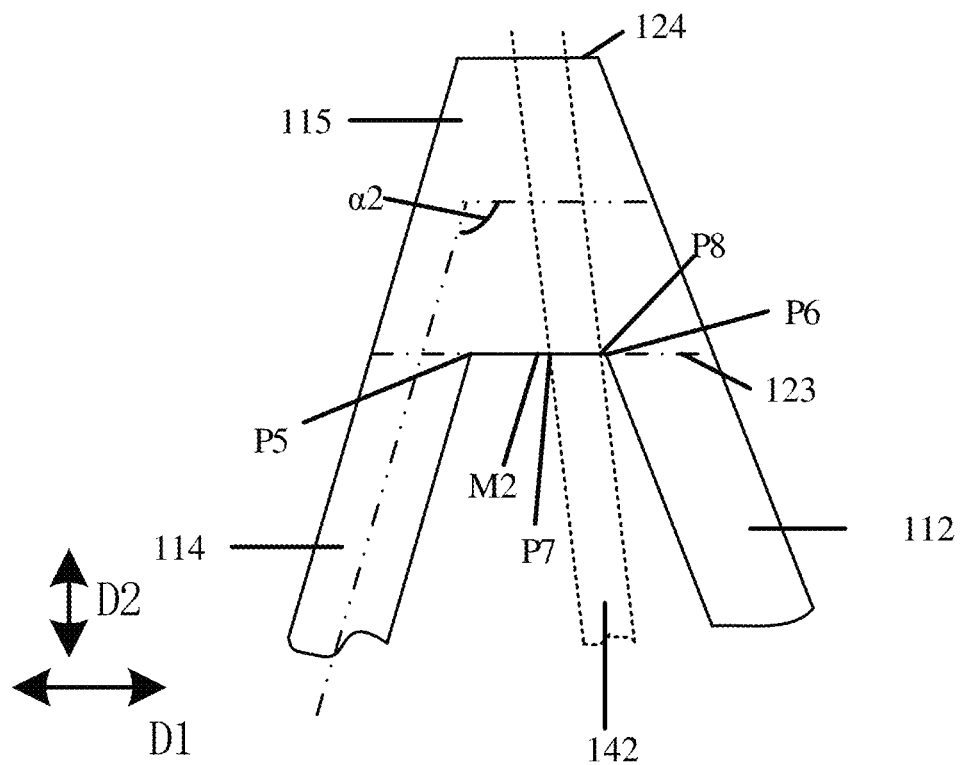
FIG. 9B is a schematic diagram of another example of a portion, located in the second region of the array substrate as illustrated in FIG. 4A, of the first signal line.
Figure 9C:
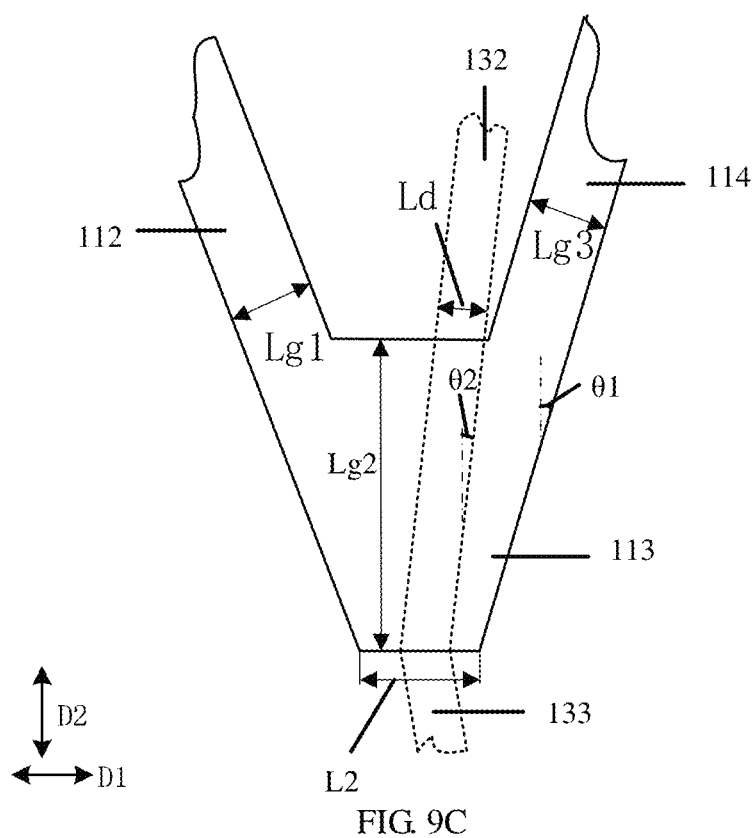
FIG. 9C is another schematic diagram of an example of the portion of the first signal line as illustrated in FIG. 9A.
Figure 9D:
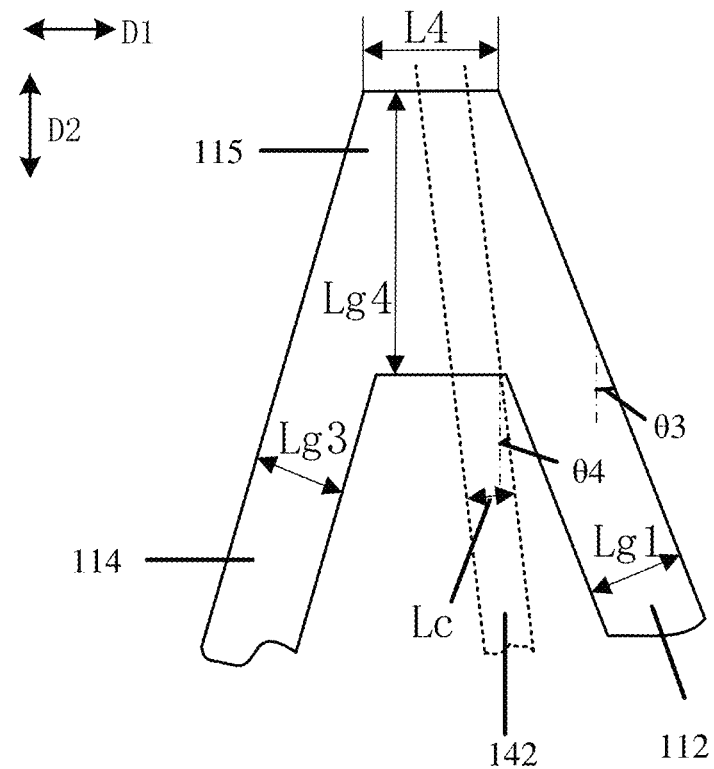
FIG. 9D is another schematic diagram of an example of the portion of the first signal line as illustrated in FIG. 9B.
Figure 10A:
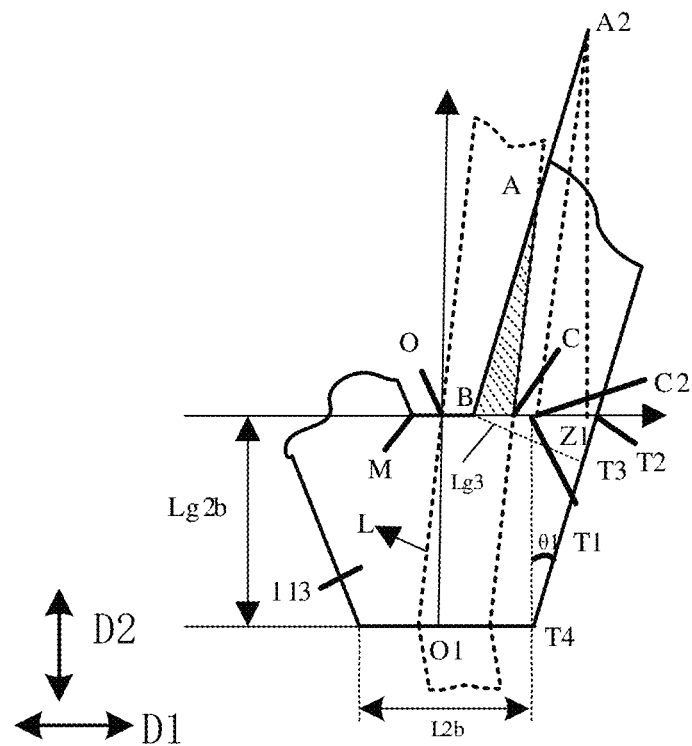
FIG. 10A is another simplified schematic diagram of the overlapping triangle between the first signal line and the second signal line as illustrated in FIG. 6A.
Figure 10B:
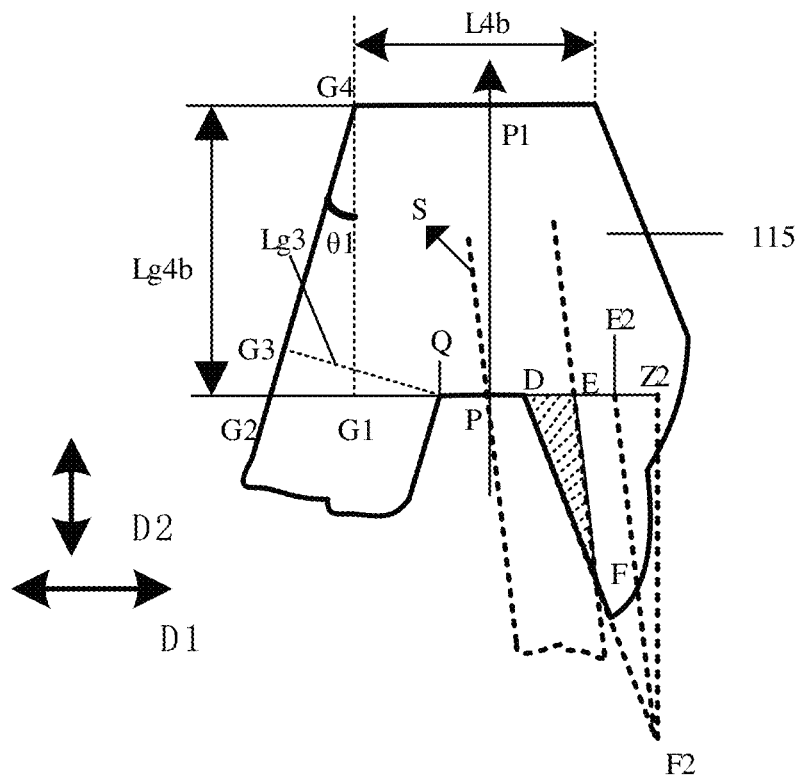
FIG. 10B is another simplified schematic diagram of the overlapping triangle between the first signal line and the third signal line as illustrated in FIG. 6B.

FIG. 9A is a schematic diagram of another example of a portion, located in the first region RE1 of the array substrate 100 as illustrated in FIG. 4A, of the first signal line 110, FIG. 9B is a schematic diagram of another example of a portion, located in the second region RE2 of the array substrate 100 as illustrated in FIG. 4A, of the first signal line 110, FIG. 9C is another schematic diagram of an example of the portion of the first signal line 110 as illustrated in FIG. 9A, and FIG. 9D is another schematic diagram of an example of the portion of the first signal line 110 as illustrated in FIG. 9B.

The structure of the portion of the first signal line 110 as illustrated in FIG. 9A and the overlapping relationship between the first signal line 110 and the second signal line 130 are similar to those of FIG. 5A, and the structure of the portion of the first signal line 110 as illustrated in FIG. 9B and the overlapping relationship between the first signal line 110 and the third signal line 140 are similar to those of FIG. 5B. Therefore, only the differences between FIG. 9A and FIG. 5A and the differences between FIG. 9B and FIG. 5B will be described here, and the similarities will not be repeated.

As illustrated in FIG. 9A to FIG. 9D, the inclination angle θ1 of the third wire portion 114 relative to the second direction D2 is greater than three times the inclination angle θ2 of the first line segment 132 relative to the second direction D2 and smaller than four times the inclination angle θ2 of the first line segment 132 relative to the second direction D2; the inclination angle θ3 of the first wire portion 112 relative to the second direction D2 is greater than three times the inclination angle θ4 of the third line segment 142 relative to the second direction D2 and smaller than four times the inclination angle θ4 of the third line segment 142 relative to the second direction D2 (the inclination angles θ1 to θ4 here are acute angles and positive values); the width Lg1 of the first wire portion 112 is greater than twice the width Ld of the second signal line 130 and smaller than three times the width Ld of the second signal line 130; the width Lg1 of the first wire portion 112 is greater than three times the width Lc of the third signal line 140 and smaller than four times the width Lc of the third signal line 140; the width Ld of the second signal line 130 is greater than the width Lc of the third signal line 140; the width Lg1 of the first wire portion 112 is greater than the length L2 of the second side 122 and the length L4 of the fourth side 124; the width Lg2 of the second wire portion 113 is greater than twice the width Lg1 of the first wire portion 112 and smaller than three times the width Lg1 of the first wire portion 112; the width Lg4 of the fourth wire portion 115 is greater than twice the width Lg1 of the first wire portion 112 and smaller than three times the width Lg1 of the first wire portion 112.

For example, the width Lg2 of the second wire portion 113 is greater than the width Lg4 of the fourth wire portion 115. For example, the inclination angle θ1 of the third wire portion 114 relative to the second direction D2 is equal to the inclination angle θ3 of the first wire portion 112 relative to the second direction D2; and the inclination angle θ2 of the first line segment 132 relative to the second direction D2 is equal to the inclination angle θ4 of the third line segment 142 relative to the second direction D2.

In the examples as illustrated in FIG. 9A to FIG. 9D, for example, Lg1=Lg3=20 microns, Ld=8 microns, Lc=6 microns; θ1=θ3=27 degrees, θ2=θ4=7 degrees; L2=18 microns, L4=17 microns; Lg2=51 microns; Lg4=47 microns.

The design idea of how to eliminate the overlapping triangle or reduce the area of the overlapping triangle between the first signal line 110 and the second signal line 130 in FIG. 6A and FIG. 6B and the overlapping triangle between the first signal line 110 and the third signal line 140 in FIG. 6A and FIG. 6B (to obtain the structures in FIG. 9A to FIG. 9D) by resetting L1b, L2b, L3b, and L4b in FIG. 6A and FIG. 6B (that is, set L1b, L2b, L3b, and L4b respectively to be L1, L2, L3 and L4) will be exemplified with reference to FIG. 7A to FIG. 7D, FIG. 8A to FIG. 8D, and FIG. 10A to FIG. 10B.

Another design idea of how to eliminate the overlapping triangle or reduce the area of the overlapping triangle between the first signal line 110 (the third wire portion 114 of the first signal line 110) and the second signal line 130 as illustrated in FIG. 6A will be exemplified with reference to FIG. 7A to FIG. 7D, and FIG. 10A (that is, by increasing the width of the second wire portion 113).

Firstly, the coordinates of point A2 in the overlapping triangle ΔA2BC2 illustrated in FIG. 7D is obtained by using the equation of the line where the line segment A2C2 is located and the equation of the line where the line segment A2B is located; the equation of the line where the line segment A2C2 is located is y_A2C2=(x−L_BC1−L_MB/2)tan(90−θ2)−DY=(x−9.56)tan(83°)−1.5; the equation of the line where the line segment A2B is located is y_A2B=(x−L_OB)tan(90−θ1)=(x−2.5)tan(63). By combining the above two equations, the coordinates of point A2 can be obtained as (12.04, 18.73), and therefore, the length L_A2Z of line segment A2Z satisfies the following equations: L_A2Z=18.73.

Next, the width Lg2*b* of the second wire portion 113 illustrated in FIG. 7A is obtained by the following derivation process.

$$Lg2b = \text{L\_OO1} = \text{L\_T1T4}$$
$$= \text{L\_T1T2} \times \tan(90 - \theta 1)$$
$$= (\text{L\_OT2} - \text{L\_OT1}) \times \tan(90 - \theta 1)$$
$$= (\text{L\_OB} + \text{L\_BT2} - \text{L\_O1T4}) \times \tan(90 - \theta 1)$$
$$= \left(\text{L\_MB}/2 + \text{L\_g3}/\sin(90 - \theta 1) - \text{L\_2}b/2\right) \times$$
$$\tan(90 - \theta 1)$$
$$= (2.5 + 20/\sin(63) - 9) \times \tan(63°)$$
$$= 31.3 \text{ (microns)}.$$

Then, allowing Lg2 to satisfy the following expression: Lg2>Lg2*b*+L_A2Z =31.3+18.73=50.03 microns. For example, Lg2=51 microns.

Another design idea of how to eliminate the overlapping triangle or reduce the area of the overlapping triangle between the first signal line 110 (the first wire portion 112 of the first signal line 110) and the third signal line 140 as illustrated in FIG. 6B will be exemplified with reference to FIG. 8A to FIG. 8D, and FIG. 10B (that is, by increasing the width of the fourth wire portion 115).

Firstly, the coordinates of point F2 in the overlapping triangle ΔF2DE2 illustrated in FIG. 7D is obtained by using the equation of the line where the line segment F2E2 is located and the equation of the line where the line segment F2D is located; the equation of the line where the line segment F2E2 is located is y_F2E2=(x−L_DE1−L_QD/2)tan(90+θ4)+DY=(x−7.55)tan(97°)+1.5; the equation of the line where the line segment F2D is located is y_F2D=(x−L_PD)tan(90+θ3)=(x−2.5)tan(117°). By combining the above two equations, the coordinates of point F2 can be obtained as (9.396, −13.534), and therefore, the length L_F2Z2 of line segment F2Z2 satisfies the following equations: L_F2Z2=13.534.

Next, the width Lg4*b* of the fourth wire portion 115 illustrated in FIG. 8A is obtained by the following derivation process.

$$Lg4b = \text{L\_PP1} = \text{L\_G1G4}$$
$$= \text{L\_G1G2} \times \tan(90 - \theta 1)$$
$$= (\text{L\_PG2} - \text{L\_PG1}) \times \tan(90 - \theta 1)$$
$$= (\text{L\_PQ} + \text{L\_QG2} - \text{L\_P1G4}) \times \tan(90 - \theta 1)$$
$$= \left(\text{L\_QD}/2 + \text{L\_g3}/\sin(90 - \theta 1) - \text{L\_4}b/2\right) \times$$
$$\tan(90 - \theta 1)$$
$$= (2.5 + 20/\sin(63) - 8.5) \times \tan(63°)$$
$$= 32.3 \text{ (microns)}.$$

Then, allowing Lg4 to satisfy the following expression: Lg4>Lg4*b*+L_F2Z2 =32.3+13.534=45.834 microns. For example, allowing Lg4 to satisfy the following expression: Lg4=47 microns.

In another example, for example, the fourth position P4 may be coincident with the second position P2; and the eighth position P8 may be coincident with the sixth position P6, but the embodiments of the present disclosure are not limited thereto. For example, the fourth position P4 is close to but not coincident with the second position P2; and the eighth position P8 is close to but not coincident with the sixth position P6.

In yet another example, the third position P3 is located at the first midpoint M1; the seventh position P7 is located at the second midpoint M2. For example, the width of the second wire portion 113 and the width of the fourth wire portion 115 are both greater than the width of the first wire portion 112; and the width of the first wire portion 112 is, for example, equal to the width of the third wire portion 114. The following is an exemplary description with reference to FIG. 11A and FIG. 11B.

Figure 11A:
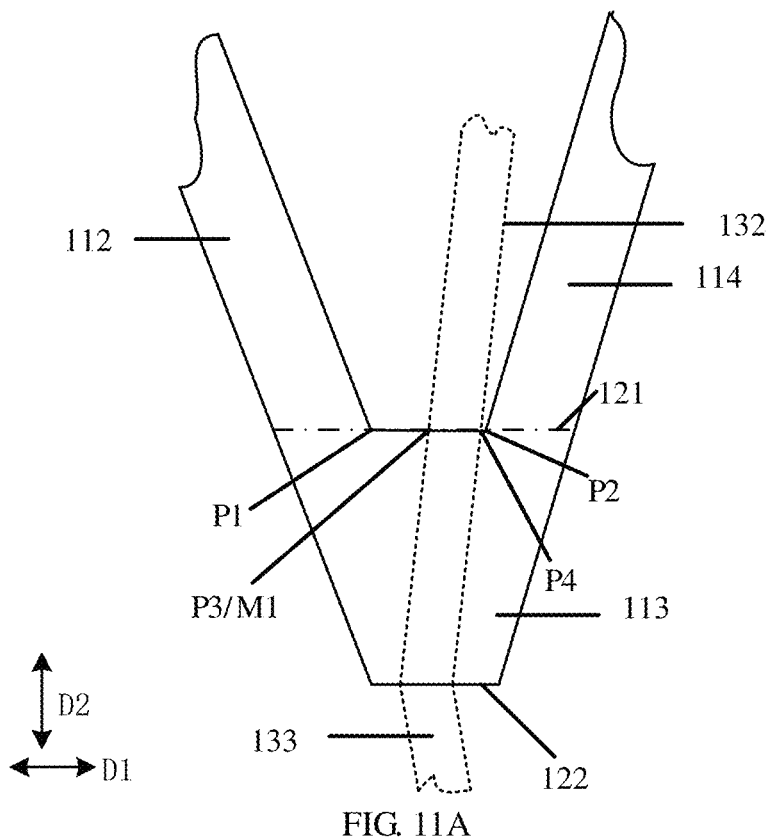
FIG. 11A is a schematic diagram of yet another example of a portion, located in the first region of the array substrate as illustrated in FIG. 4A, of the first signal line.
Figure 11B:
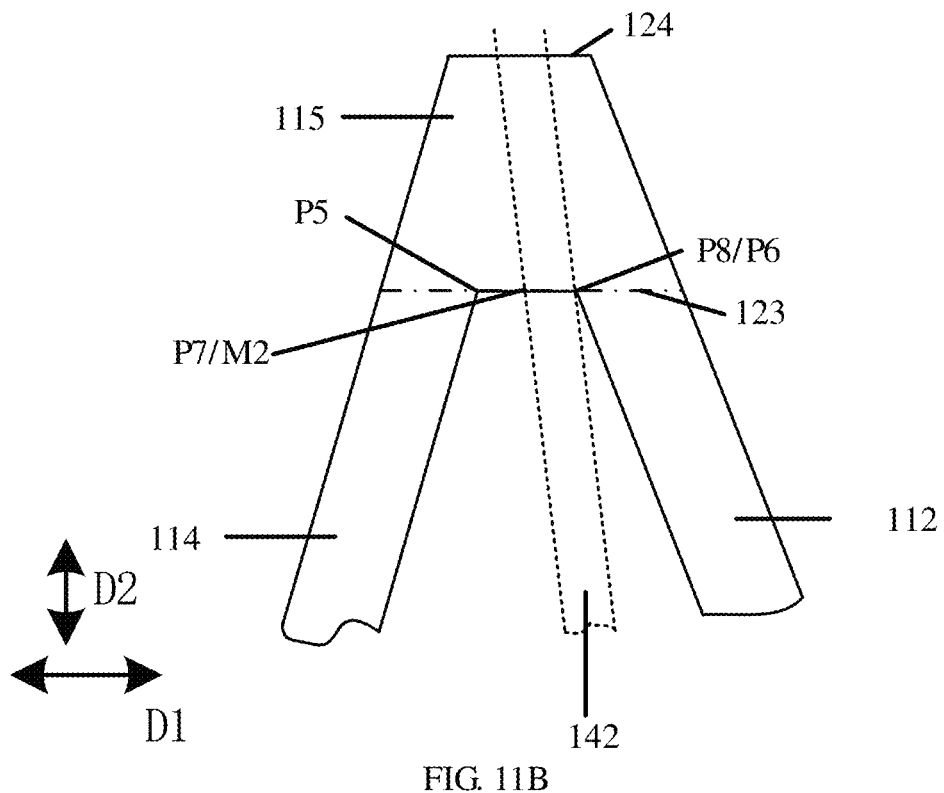
FIG. 11B is a schematic diagram of yet another example of a portion, located in the second region of the array substrate as illustrated in FIG. 4A, of the first signal line.

FIG. 11A is a schematic diagram of yet another example of a portion, located in the first region of the array substrate as illustrated in FIG. 4A, of the first signal line; and FIG. 11B is a schematic diagram of yet another example of a portion, located in the second region of the array substrate as illustrated in FIG. 4A, of the first signal line.

As illustrated in FIG. 11A, the third position P3 and the fourth position P4 are both located between the first position P1 and the second position P2, and the third position P3 is located at the first midpoint M1. As illustrated in FIG. 11B, the seventh position P7 and the eighth position P8 are both located between the fifth position P5 and the sixth position P6, and the seventh position P7 is located at the second midpoint M2. For example, as illustrated in FIG. 11A, the fourth position P4 is close to but not coincident with the second position P2; as illustrated in FIG. 11B, the eighth position P8 is coincident with the sixth position P6, but the embodiments of the present disclosure are not limited thereto. For example, the fourth position P4 is coincident with the second position P2; and the eighth position P8 is close to but not coincident with the sixth position P6.

In yet another example, the design idea of parallel shifting the third wire portion 114 of the first signal line 110 and the design idea of increasing the width of the second wire portion 113 may be both applied to eliminate the overlapping triangle or reduce the area of the overlapping triangle between the third wire portion 114 of the first signal line 110 and the second signal line 130; the design idea of parallel shifting the first wire portion 112 of the first signal line 110 and the design idea of increasing the width of the fourth wire portion 115 may be both applied to eliminate the overlapping triangle or reduce the area of the overlapping triangle between the first wire portion 112 of the first signal line 110 and the third signal line 140. For specific design ideas, please refer to the previous examples, which will not be repeated here.

For example, by reducing or eliminating the overlapping triangle between the third wire portion 114 of the first signal line 110 and the second signal line 130 through adopting the design idea of parallel shifting the third wire portion 114 of the first signal line 110 and the design idea of increasing the width of the second wire portion 113, it can prevent the width and length of the second wire portion 113 from increasing too much, and thus it can be compatible with the current manufacturing process with better effect.

In yet another example, the third position P3 is located between the first position P1 and the first midpoint Ml; and the seventh position P7 is located between the fifth position P5 and the second midpoint M2. For example, the distance between the third position P3 and the first position P1 is relatively small; and the distance between the seventh position P7 and the fifth position P5 is relatively small. The following is an exemplary description with reference to FIG. 11C and FIG. 11D.

Figure 11C:
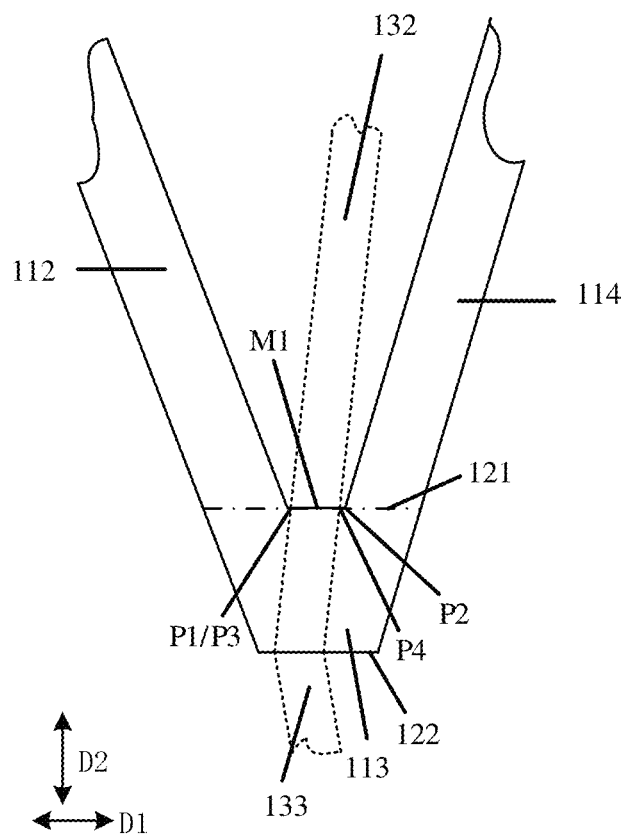
FIG. 11C is a schematic diagram of yet another example of a portion, located in the first region of the array substrate as illustrated in FIG. 4A, of the first signal line.
Figure 11D:
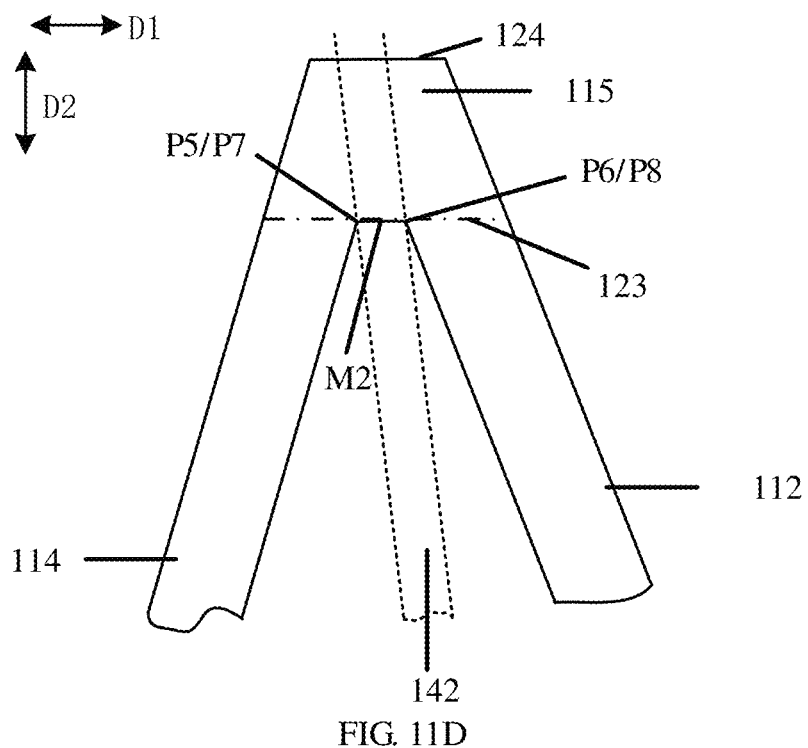
FIG. 11D is a schematic diagram of yet another example of a portion, located in the second region of the array substrate as illustrated in FIG. 4A, of the first signal line.

FIG. 11C is a schematic diagram of yet another example of a portion, located in the first region of the array substrate as illustrated in FIG. 4A, of the first signal line; and FIG. 11D is a schematic diagram of yet another example of a portion, located in the second region of the array substrate as illustrated in FIG. 4A, of the first signal line.

As illustrated in FIG. 11C and FIG. 11D, the third position P3 and the fourth position P4 are both located between the first position P1 and the second position P2, and the seventh position P7 and the eighth position P8 are both located between the fifth position P5 and the sixth position P6.

For example, as illustrated in FIG. 11C and FIG. 11D, the third position P3 is coincident with the first position P1; and as illustrated in FIG. 11B, the seventh position P7 is coincident with the fifth position P5, but the embodiments of the present disclosure are not limited thereto. For example, the third position P3 is coincident with the first position P1, and the seventh position P7 is close to but not coincident with the fifth position P5; for another example, the third position P3 is close to but not coincident with the first position P1, and the seventh position P7 is close to but not coincident with the fifth position P5. It should be noted that two positions are close to but not coincident with each other means that the distance between the two positions is greater than zero and smaller than two microns (for example, smaller than one micron).

For example, as illustrated in FIG. 11C and FIG. 11D, the fourth position P4 is coincident with the second position P2; the eighth position P8 is coincident with the sixth position P6, but the embodiments of the present disclosure are not limited thereto. For example, the fourth position P4 is close to but not coincident with the second position P2; and the eighth position P8 is close to but not coincident with the sixth position P6.

For example, the width of the first wire portion 112 is equal to the width of the third wire portion 114; and the width of the second wire portion 113 is greater than the width of the first wire portion 112 and smaller than twice the width of the first wire portion 112.

In yet another example, the overlapping triangle can be eliminated or reduced by the following design and/or manufacturing idea. For example, the following design and/or manufacturing idea may be adopted by allowing the third position P3 to be located between the first position P1 and the first midpoint M1 (for example, allowing the third position P3 to be coincide with the first position P1), and allowing the seventh position P7 to be located between the fifth position P5 and the second midpoint M2 (for example, allowing the seventh position P7 to be coincide with the fifth position P5).

For example, the length of the line segment, located between the first position P1 and the second position P2, of the first side 121 and the length of the line segment, located between the fifth position P5 and the sixth position P6, of the third side 123 can be increased by reducing the width of the first signal line 110 (for example, the widths of the first wire portion 112 and the third wire portion 114 of the first signal line 110). For example, the length of the line segment, located between the third position P3 and the fourth position P4, of the first side 121 can be reduced by reducing the width of the second signal line 130. For example, the length of the line segment, located between the seventh position P7 and the eighth position P8, of the third side 123 can be reduced by reducing the width of the third signal line 140. For example, by reducing the width of at least one of the first signal line 110, the second signal line 130, and the third signal line 140 (for example, each of the first signal line 110, the second signal line 130, and the third signal line 140), the width of the line segment, located between the first position P1 and the second position P2, of the first side 121 can be greater than the length of the line segment, located between the third position P3 and the fourth position P4, of the first side 121, and the length of the line segment, located between the fifth position P5 and the sixth position P6, of the third side 123 can be greater than the length of the line segment, located between the seventh position P7 and the eighth position P8, of the third side 123. In this case, the possibility that the third position P3 and the fourth position P4 are both located between the first position P1 and the second position P2 and the possibility that the seventh position P7 and the eighth position P8 are both located between the fifth position P5 and the sixth position P6 are increased, and the possibility that the second signal line 130 is overlapped with the third wire portion 114 of the first signal line 110 and the possibility that the third signal line 140 is overlapped with the first wire portion 112 of the first signal line 110 can be reduced, and thus the possibility of forming an overlapping triangle between the second signal line 130 and the first signal line 110 and the possibility of forming an overlapping triangle between the third signal line 140 and the first signal line 110 can be reduced, thereby reducing the possibility of forming defects caused by electrostatic discharge (for example, short-circuit defect).

For example, the line width of at least one of the first signal line 110, the second signal line 130, and the third signal line 140 of the array substrate 100 (for example, each of the first signal line 110, the second signal line 130, and the third signal line 140) can be reduced by reducing design value of the line width of at least one of the first signal line 110, the second signal line 130, and the third signal line 140 of the array substrate 100 (for example, each of the first signal line 110, the second signal line 130, and the third signal line 140); in this case, a new mask can be designed and used in the manufacturing process. For another example, the critical dimension (Development Critical Dimension, DICD) of photoresist can be reduced by increasing the exposure dose of the exposure machine to reduce the line width of at least one of the first signal line 110, the second signal line 130, and the third signal line 140 (for example, each of the first signal line 110, the second signal line 130, and the third signal line 140); in this case, the mask used in the related art can be used, and designing and adopting a new mask is not necessary.

For example, in order to avoid that the width (line width) of the first signal line 110, the second signal line 130, and the third signal line 140 are reduced too much and avoid that the charging rates of the first signal line 110, the second signal line 130, and the third signal line 140 are adversely affected, the design idea of reducing the line width of at least one of the first signal line 110, the second signal line 130, and the third signal line 140 (for example, each of the first signal line 110, the second signal line 130, and the third signal line 140) to eliminate or reduce the overlapping triangle may further be combined with at least one of the following three design ideas to eliminate or reduce the overlapping triangle. (1) The length of the line segment, located between the first position P1 and the second position P2, of the first side 121 is increased by parallel shifting the third wire portion 114 of the first signal line 110, and the length of the line segment, located between the fifth position P5 and the sixth position P6, of the third side 123 is increased by parallel shifting the first wire portion of the first signal line 110. (2) The length of the line segment, located between the first position P1 and the second position P2, of the first side 121 is increased by increasing the width of the second wire portion 113, and the length of the line segment, located between the fifth position P5 and the sixth position P6, of the third side 123 is increased by increasing the width of the fourth wire portion 115. (3) The distance between the third position P3 and the first position P1 is reduced by parallel shifting the second signal line 130 (for example, so as to enable the fourth position P4 to also be located between the first position P1 and the second position P2), and the distance between the seventh position P7 and the fifth position P5 is reduced by parallel shifting the third signal line 140 (for example, so as to enable the eighth position P8 to also be located between the fifth position P5 and the sixth position P6). For example, the previous examples may be referred for the first and second design ideas, and thus the first and second design ideas will not be repeated here. The third design idea is specifically described below.

For example, as can be seen from the examples as illustrated in FIG. 7D and FIG. 8D, in the case where the second signal line 130 is shifted toward the right side along the x direction (shifted away from the first position P1) and shifted downward along the y direction (shifted toward the direction from the first side 121 to the second side 122), the area of the overlapping triangle between the second signal line 130 and the first signal line 110 is increased; and in the case where the third signal line 140 is shifted toward the right side along the x direction (shifted away from the fifth position P5) and shifted toward the upside along the y direction (shifted toward the direction from the third side 123 to the fourth side 124), the area of the overlapping triangle between the third signal line 140 and the first signal line 110 is increased. Correspondingly, in the case where the second signal line 130 is shifted toward the left side along the x direction (shifted toward the first position P1) and shifted toward the upside along the y direction (shifted toward the direction from the second side 122 to the first side 121), the area of the overlapping triangle between the second signal line 130 and the first signal line 110 is reduced; and in the case where the third signal line 140 is shifted toward the left side along the x direction (shifted toward the fifth position P5) and shifted downward along the y direction (shifted toward the direction from the fourth side 124 to the third side 123), the area of the overlapping triangle between the third signal line 140 and the first signal line 110 is reduced.

For example, during the design process, a preset overlapping position of the second signal line 130 and the second wire portion 113 and a preset overlapping position of the third signal line 140 and the fourth wire portion 115 may be changed to realize the above-mentioned shifting of the second signal line 130 and the third signal line 140 (relative to the structures illustrated in FIG. 6A and FIG. 6B) in the final product of the array substrate 100; in this case, a new mask can be designed and used in the manufacturing process.

For another example, the above-mentioned shifting of the second signal line 130 and the third signal line 140 (relative to the structures illustrated in FIG. 6A and FIG. 6B) can be achieved in the final product of the array substrate 100 by using the offset feedback function of the exposure machine; in this case, the mask used in the related art can be adopted. The specific method is as follows.

In the process of manufacturing the array substrate 100 (thin film transistor substrate), in order to ensure that serious misalignment is not presented between layers of the array substrate 100, an alignment operation must be performed in the process of manufacturing each film layer (for example, a mask is used to pattern a thin film). For example, the mask for manufacturing the second signal line 130 is aligned with the mask for manufacturing the first signal line 110 (for example, indirect alignment). For example, the alignment mark on the base substrate of the array substrate 100 can be used for alignment.

In the examples as illustrated in FIG. 7D and FIG. 8D, the absolute values of the maximum horizontal alignment errors and the maximum vertical alignment errors of the third signal line 140 and the second signal line 130 relative to the first signal line 110 are both 1.5 microns. In this case, the area of the overlapping triangle between the second signal line 130 and the first signal line 110 is the largest when the second signal line 130 is shifted toward the right side by 1.5 microns along the x direction and shifted downward by 1.5 microns along the y direction; and the area of the overlapping triangle between the third signal line 140 and the first signal line 110 is the largest when the third signal line 140 is shifted toward the right side by 1.5 microns along the x direction and shifted upward by 1.5 microns along the y direction. Correspondingly, the area of the overlapping triangle between the second signal line 130 and the first signal line 110 is the smallest when the second signal line 130 is shifted toward the left side by 1.5 microns along the x direction and shifted upward by 1.5 microns along the y direction; and the area of the overlapping triangle between the third signal line 140 and the first signal line 110 is the smallest when the third signal line 140 is shifted toward the left side by 1.5 microns in the x direction and shifted downward by 1.5 microns in the y direction. For example, by strictly controlling the alignment error, the second signal line 130 can be shifted toward the left side by 1.5 microns along the x direction and shifted upward by 1.5 microns along the y direction, and the third signal line 140 can be shifted toward the left side by 1.5 microns along the x direction and shifted downward by 1.5 microns along the y direction. For example, the above-mentioned shifting of the second signal line 130 and the third signal line 140 may be realized by using overlay feedback on the operation page of the exposure machine.

For example, in at least one embodiment of the present disclosure, the overlapping triangle between the third wire portion 114 of the first signal line 110 and the second signal line 130 and the overlapping triangle between the first wire portion 112 of the first signal line 110 and the third signal line 140 can be eliminated by designing the region where the first signal line 110 (for example, a gate line) is overlapped with the second signal line 130 and the region where the first signal line 110 is overlapped with the third signal line 140 (for example, compared to redesign of related structures), thereby reducing the possibility of forming defects caused by electrostatic discharge (for example, the short-circuit defect between the third wire portion 114 of the first signal line 110 and the second signal line 130 and the short-circuit defect between the first wire portion 112 of the first signal line 110 and the third signal line 140). For example, the above design of the region where the first signal line 110 (for example, a gate line) is overlapped with the second signal line 130 and the region where the first signal line 110 is overlapped with the third signal line 140 has less influence on the parameters of other structures (the width of the black matrix, the overlapping capacitance between wires) of a light control panel including the array substrate 100 (for example, the influences are within a controllable and acceptable range). For example, the design idea of eliminating the overlapping triangle provided by at least one embodiment of the present disclosure is simple, and the structure of the first signal line (the structure of the bend portion of the gate line) obtained by using the design idea of eliminating the overlapping triangle provided by at least one embodiment of the present disclosure is easy to implement. For example, the array substrate provided by at least one embodiment of the present disclosure is suitable for display devices with dual liquid crystal cells with medium and large sizes (for example, greater than 60 inches; for example, 65 inches and 75 inches).

The following points need to be explained.

1. Although the examples as illustrated in FIG. 5A to FIG. 5D and the examples as illustrated in FIG. 9A to FIG. 9D adopt the same design idea to eliminate the overlapping triangle between the third wire portion 114 of the first signal line 110 and the second signal line 130 and to eliminate the overlapping triangle between the first wire portion 112 of the first signal line 110 and the third signal line 140; for example, in the examples as illustrated in FIG. 5A to FIG. 5D, the third wire portion 114 and the first wire portion 112 of the first signal line 110 are parallel shifted to eliminate the overlapping triangle; in the example as illustrated in FIG. 9A to FIG. 9D, the widths of the second wire portion 113 and the four wire portions 115 of the first signal line 110 are increased to eliminate the overlapping triangle; but the embodiments of the present disclosure are not limited to this. Elimination of the overlapping triangle between the third wire portion 114 of the first signal line 110 and the second signal line 130 and elimination of the overlapping triangle between the first wire portion 112 of the first signal line 110 and the third signal line 140 can be realized through different design ideas. Correspondingly, in the final product of the array substrate 100, the structure of the first signal line 110, the relative positional relationship between the first signal line 110 and the second signal line 130, and the relative positional relationship between the first signal line 110 and the third signal line 140 are changed accordingly. For example, the overlapping triangle between the third wire portion 114 of the first signal line 110 and the second signal line 130 can be eliminated by parallel shifting the third wire portion 114 of the first signal line 110, and the overlapping triangle between the first wire portion 112 of the first signal line 110 and the third signal line 140 can be eliminated by increasing the width of the fourth wire portion 115; correspondingly, the third position P3 is located between the first midpoint M1 and the first position P1, the seventh position P7 is located between the second midpoint M2 and the eighth position P8, and the orthographic projection of the intersection point of the fourth side 124 and the side, closer to the third wire portion 114, of the third signal line 140 on the third side 123 is located the side of the second midpoint M2 away from the seventh position P7. For another example, the overlapping triangle between the third wire portion 114 of the first signal line 110 and the second signal line 130 can be eliminated by reducing the line width of at least one of the first signal line 110 and the second signal line 130 (for example, each of the first signal line 110 and the second signal line 130), and by strictly controlling the misalignment of the second signal line 130 relative to the first signal line 110 in the manufacturing process of the array substrate 100, and the overlapping triangle between the first wire portion 112 of the first signal line 110 and the third signal line 140 can be eliminated by parallel shifting the first wire portion 112 of the first signal line 110.

2. Although the examples as illustrated in FIG. 5A to FIG. 5D and the examples as illustrated in FIG. 9A to FIG. 9D can eliminate both the overlapping triangle between the third wire portion 114 of the first signal line 110 and the second signal line 130 and the overlapping triangle between the first wire portion 112 of the first signal line 110 and the third signal line 140, but the embodiments of the present disclosure are not limited thereto. In one example, only the overlapping triangle between the third wire portion 114 of the first signal line 110 and the second signal line 130 is eliminated; and in another example, only the overlapping triangle between the first wire portion 112 of the first signal line 110 and the third signal line 140 is eliminated. For example, in the case where only the overlapping triangle between the first wire portion 112 of the first signal line 110 and the third signal line 140 (for example, the common electrode line) is eliminated, the third wire portion 114, the fourth wire portion 115, the first wire portion 112, the second wire portion 113, and the third signal line 140 can be referred to as the first wire portion, the second wire portion, the third wire portion, the fourth wire portion, and the second signal line, respectively, and no further description will be given here.

3. For example, the design idea provided by at least one embodiment of the present disclosure can be adopted to eliminate the overlapping triangle of each bending-line structure 111 (first bending-line structure) of the array substrate 100; for another example, the design idea provided by at least one embodiment of the present disclosure can be adopted to only eliminate overlapping triangles of part of bending-line structures 111 (first bending-line structure) of the array substrate 100.

4. Although the bending-line structures 111 (first bending-line structures) of the first signal line 110 in the examples as illustrated in FIG. 5A to FIG. 5D and the examples as illustrated in FIG. 9A to FIG. 9D all include the first wire portion 112, the second wire portion 113, the third wire portion 114, and the fourth wire portion 115, but the embodiments of the present disclosure are not limited thereto. For example, each bending-line structure 111 (first bending-line structure) of the first signal line 110 includes only the first wire portion 112, the second wire portion 113, and the third wire portion 114 that are directly connected in sequence. In this case, the third wire portion 114 of each bending-line structure 111 of the first signal line 110 is directly connected to the first wire portion 112 of the bending-line structure 111 that is adjacent to the each of bending-line structures 111. For another example, each bending-line structure 111 (first bending-line structure) of the first signal line 110 includes only the first wire portion 112, the third wire portion 114, and the fourth wire portion 115 that are directly connected in sequence. For another example, part of the bending-line structures 111 (first bending-line structure) of the first signal line 110 include the first wire portion 112, the second wire portion 113, the third wire portion 114, and the fourth wire portion 115, and the remaining bending-line structures 111 (first bending-line structure) of the signal line 110 include only the first wire portion 112, the second wire portion 113, and the third wire portion 114 that are directly connected in sequence, or include only the first wire portion 112, the third wire portion 114, and the fourth wire portion 115 that are directly connected in sequence.

5. Although in the array substrate 100 as illustrated in FIG. 4A, the plurality of second signal lines 130 (for example, data lines) and the plurality of third signal lines 140 (for example, common electrode lines) are alternately arranged in the first direction D1, the embodiments of the present disclosure are not limited to this. For example, two second signal lines 130 may be provided between every two adjacent third signal lines 140.

Figure 12A:
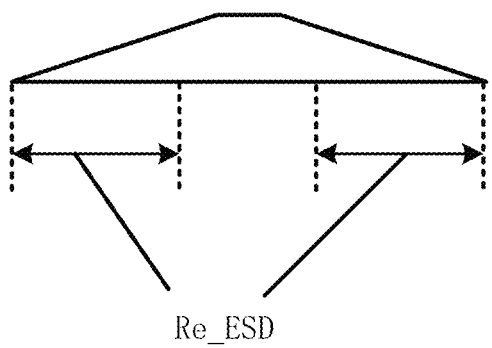
FIG. 12A is a schematic cross-sectional diagram of a signal line in the case where an angle of a slope of the signal line is relatively small.
Figure 12B:
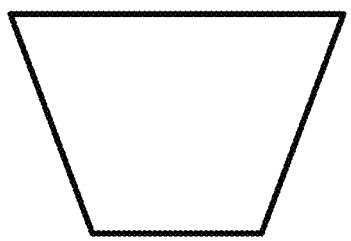
FIG. 12B is a schematic diagram of an undercut caused by etching deviation in the case where the angle of the slope of the signal line is relatively large.

For example, the following is an exemplary description of the setting method of the angle of the slope of at least one of the first signal line 110, the second signal line 130, and the third signal line 140 with reference to FIG. 12A and FIG. 12B.

For example, the angle of the slope of at least one of the first signal line 110, the second signal line 130, and the third signal line 140 (for example, each of the first signal line 110, the second signal line 130, and the third signal line 140) is between 40 degrees and 60 degrees (for example, about 50 degrees). For example, by making the angle of the slope of at least one of the first signal line 110, the second signal line 130, and the third signal line 140 between 40 degrees and 60 degrees (for example, about 50 degrees), the step coverage of the film formed above the signal line can be improved, and the possibility of forming defects caused by electrostatic discharge can be further reduced. The specific analysis is as follows.

FIG. 12A is a schematic cross-sectional diagram of a signal line in the case where the angle of the slope of the signal line is relatively small. As illustrated in FIG. 12A, in the case where the angle of the slope of the signal line is relatively small (for example, smaller than 30 degrees), the region Re_ESD, with a relatively small thickness, of the signal line is relatively wide. The following is an exemplary description with reference to the overlapping triangle in FIG. 3B. As illustrated in FIG. 3B, the position where the electrostatic discharge easily occurs is a position where the edge of the third wire portion 114 of the first signal line 110 is overlapped with the edge of the second signal line 130 (in a direction perpendicular to the array substrate 100), that is, the tip of the overlapping triangle (that is, the vertex with the smallest angle in the triangle); in the case where the angle of the slope of the signal line is relatively small, because the width of the region, the thickness of which is relatively small, of the edge region of the third wire portion 114 of the first signal line 110 and the width of the region, the thickness of which is relatively small, of the edge region of the second signal line 130 are increased, and the electrostatic charges accumulated on the edge region of the third wire portion 114 of the first signal line 110 and the edge region of the second signal line 130 are not easily conducted along the wire portion, and therefore, the regions on which electrostatic charges are easily accumulated, of the edge region of the third wire portion 114 of the first signal line 110 and the edge region of the second signal line 130 are increased, and the time for accumulating electrostatic charges required for causing electrostatic discharge in the regions on which electrostatic charges are easily accumulated is reduced, and therefore, in the case where the angle of the slope of the signal line is smaller, defects caused by electrostatic discharge is more likely to present in the region where the edge region of the third wire portion 114 of the first signal line 110 is overlapped with the edge region of the second signal line 130.

FIG. 12B is a schematic diagram of undercut caused by etching deviation in the case where the angle of the slope (designed slope angle) of the signal line is relatively large (for example, the angle of the slope is greater than 70 degrees).

For example, by making the angle of the slope of at least one of the first signal line 110, the second signal line 130, and the third signal line 140 between 40 degrees and 60 degrees (for example, about 50 degrees), the processing time of the signal lines and the process difficulty can also be reduced, thereby increasing the processing speed of the array substrate 100.

Figure 13:
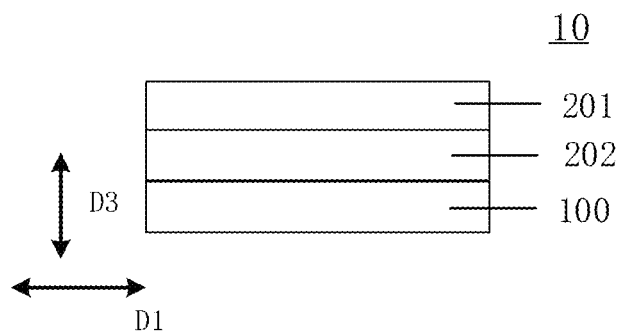
FIG. 13 is a schematic cross-sectional diagram of a light control panel provided by at least one embodiment of the present disclosure.

At least one embodiment of the present disclosure further provides a light control panel 10. FIG. 13 is a schematic cross-sectional diagram of the light control panel 10 provided by at least one embodiment of the present disclosure. As illustrated in FIG. 13, the light control panel 10 includes an opposite substrate 201, a liquid crystal layer 202, and any array substrate 100 provided by at least one embodiment of the present disclosure. The array substrate 100 and the opposite substrate 201 are arranged oppositely, and the liquid crystal layer 202 is sandwiched between the array substrate 100 and the opposite substrate 201. For example, the opposite substrate 201 includes a black matrix unit but does not include a color filter. For example, as illustrated in FIG. 13, the opposite substrate 201, the liquid crystal layer 202 and the array substrate 100 are sequentially arranged in the third direction D3. For example, the third direction D3, the first direction D1, and the second direction D2 are intersected with each other (for example, perpendicular to each other).

For example, the light control panel 10 includes a plurality of light control units (not illustrated in figures) arranged in an array. For example, the plurality of light control pixel units of the array substrate 100 are respectively arranged in corresponding light control units. For example, the light control unit further includes a portion of the liquid crystal layer and a portion, stacked with the light control pixel unit in the third direction D3, of the opposite substrate.

For example, the light control panel 10 can adjust the transmittance of each light control unit of the light control panel 10 based on the data signal received by the data line of the array substrate, and therefore, the light control unit of the light control panel 10 can be used to control the intensity of light that is incident on a display sub-pixel unit, corresponding to the light control unit, of the display panel, such that the light control panel 10 can be used to provide adjusted backlight to the display panel (the display panel of a display device including the light control panel).

For example, the light control panel can reduce the possibility of forming defects (for example, short-circuit defect) caused by electrostatic discharge.

Figure 14:
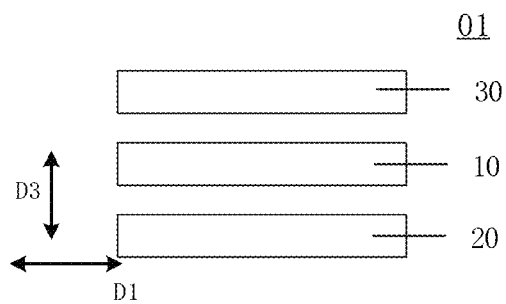
FIG. 14 is a schematic cross-sectional diagram of a display device provided by at least one embodiment of the present disclosure.

FIG. 14 is a schematic cross-sectional diagram of a display device 01 provided by at least one embodiment of the present disclosure. As illustrated in FIG. 14, the display device 01 includes a display panel 30, a backlight unit 20, and any light control panel 10 provided by at least one embodiment of the present disclosure that are stacked with each other in the third direction D3. The display panel 30 is located on the light output side of the light control panel 10, and the backlight unit 20 is located on the side of the light control panel 10 away from the display panel 30. For example, as illustrated in FIG. 14, the display panel 30, the light control panel 10, and the backlight unit 20 are sequentially arranged in the third direction D3. For example, the array substrate 100 of the light control panel 10 is closer to the backlight unit 20 than the opposite substrate 201 of the light control panel 10.

Figure 15A:
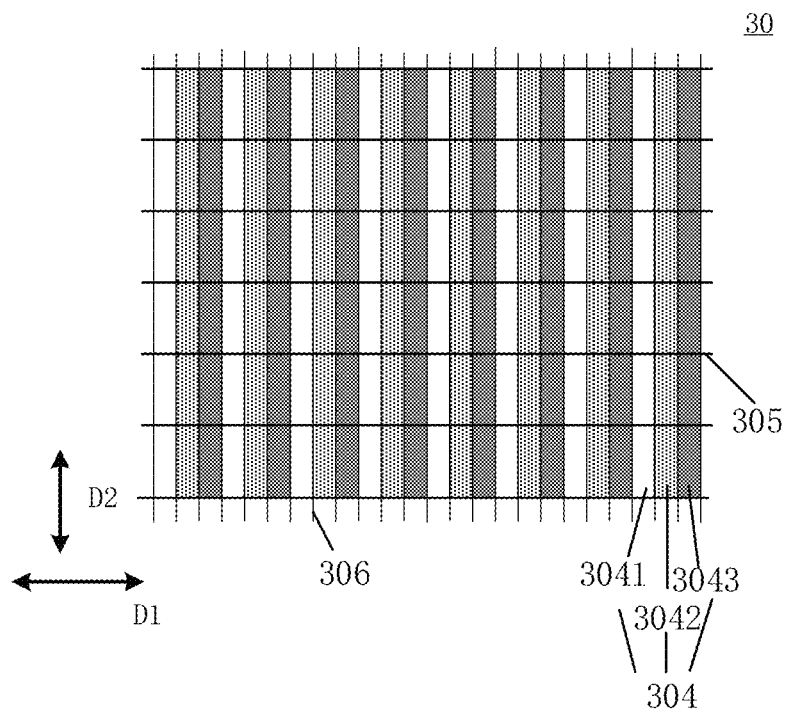
FIG. 15A is a schematic plan view of a display panel of the display device as illustrated in FIG. 14.

FIG. 15A is a schematic plan view of the display panel 30 of the display device 01 illustrated in FIG. 14. As illustrated in FIG. 15A, the display panel 30 includes a plurality of first signal lines 305 extending in the first direction D1 and a plurality of second signal lines 306 extending in the second direction D2, the plurality of first signal lines 305 are intersected with the plurality of second signal lines 306 to define a plurality of display sub-pixel units arranged in an array, and the plurality of display sub-pixel units form a plurality of display pixel units 304 arranged in an array. For example, the first signal line 305 is a gate line of the display panel 20, and the second signal line 306 is a data line of the display panel 30. For example, the first signal line 305 and the second signal line 306 are connected to different signal sources. As illustrated in FIG. 15A, each display pixel unit 304 includes a first display sub-pixel unit 3041, a second display sub-pixel unit 3042, and a third display sub-pixel unit 3043, and the first display sub-pixel unit 3041, the second display sub-pixel unit 3042, and the third display sub-pixel unit 3043 are, for example, a red display sub-pixel unit, a green display sub-pixel unit, and a blue display sub-pixel unit, respectively.

Figure 15B:
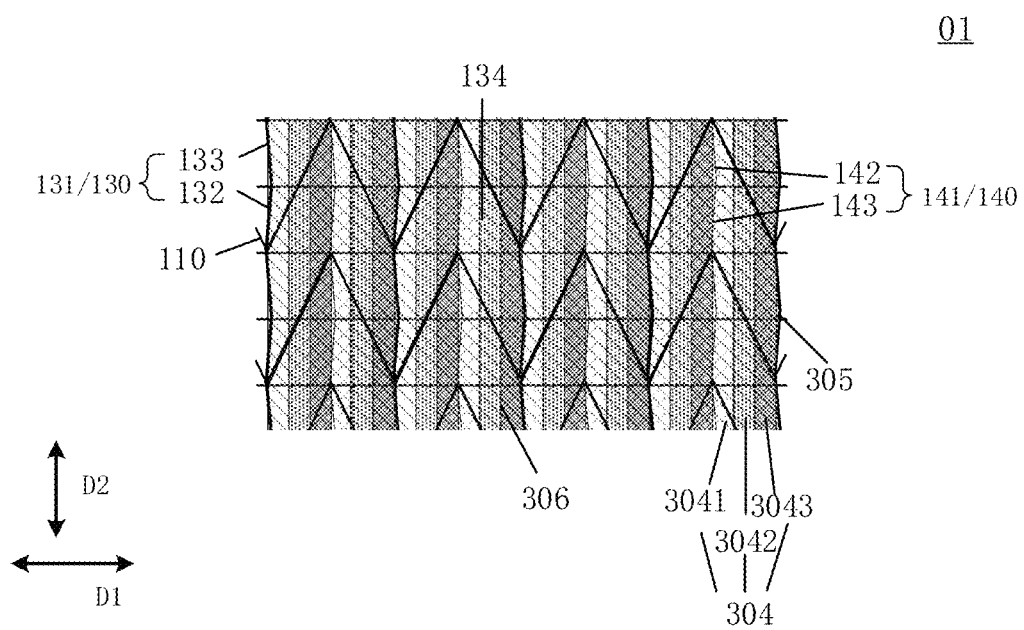
FIG. 15B is a schematic plan view of the display device as illustrated in FIG. 14.

FIG. 15B is a schematic plan view of the display device 01 illustrated in FIG. 14. For example, as illustrated in FIG. 15B, the size of each light control pixel unit 130 in the first direction D1 is equal to twice the size of each display pixel unit 304 in the first direction D1, and the size of each light control pixel unit 130 in the second direction D2 is equal to or slightly smaller than four times the size of each display pixel unit 304 in the second direction D2.

For example, the display device 01 further includes an isotropic diffusion film (not illustrated in the figure) provided between the display panel 30 and the light control panel 10. The isotropic diffusion film can diffuse the light emitted by the light control panel 10 toward a small angle range, thereby blurring the pattern of the data lines to further eliminate moire pattern, and the direction of the light emitted by the light control panel 10 will not be greatly affected by the isotropic diffusion film.

For example, the display device 01 may be any product or component having a display function, such as a mobile phone, a tablet computer, a television, a display, a notebook computer, a digital photo frame, a navigator, and the like. It should be noted that, for other components of the display device 01 (for example, control device, image data encoding/decoding device, row scan driver, column scan driver, clock circuit, etc.), applicable components can be adopted, this should be understood by those skilled in the art, no further descriptions will be given here and it should not be construed as a limitation on the embodiments of the present disclosure.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

The above descriptions are only exemplary embodiments of the present disclosure and are not intended to limit the scope of protection of the present disclosure, which is determined by the appended claims.

What is claimed is:

1. An array substrate, comprising:
   a first signal line for a sub-pixel row, wherein the first signal line as a whole extends in a first direction, and
   a second signal line for a sub-pixel column,
   wherein the second signal line as a whole extends in a second direction that is intersected with the first direction;
   the first signal line comprises a plurality of bending-line structures directly connected in sequence, and each of the plurality of bending-line structures comprises a first wire portion, a second wire portion and a third wire portion directly connected in sequence;
   an extension direction of the first wire portion and an extension direction of the third wire portion are both intersected with the first direction and the second direction, and the second wire portion extends along the first direction;
   a center line, extending along the extension direction of the first wire portion, of the first wire portion is intersected with a center line, extending along an extension direction of the second wire portion, of the second wire portion to form a first angle;
   the second wire portion comprises a first side and a second side opposite to each other in the second direction, and the first side is located at an inner side of the first angle and the second side is located at an outer side of the first angle;
   a side of the first wire portion closer to the second signal line is intersected with the first side at a first position of the first side, and a side of the third wire portion closer to the second signal line is intersected with the first side at a second position of the first side;
   a side, closer to the first wire portion, of an orthographic projection of the second signal line on an electrode layer where the first signal line is located is intersected with the first side at a third position of the first side, and a side, closer to the third wire portion, of the orthographic projection of the second signal line on the electrode layer where the first signal line is located is intersected with the first side at a fourth position of the first side; and
   a length of a line segment between the first position and the second position of the first side is greater than a length of a line segment between the third position and the fourth position of the first side;
   wherein the second signal line comprises a first line segment;
   the first line segment is a portion of the second signal line between the first wire portion and the second wire portion; and
   the first line segment and the third wire portion are inclined toward a same direction with respect to the second direction.

2. The array substrate according to claim 1, wherein the third position and the fourth position are both between the first position and the second position.

3. The array substrate according to claim 1, wherein the third position is between a first midpoint and the first position, and the first midpoint is a midpoint of the line segment between the first position and the second position of the first side.

4. The array substrate according to claim 3, wherein the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a data line, and a width of the first wire portion is greater than twice a width of the second signal line and smaller than three times the width of the second signal line; and
the width of the first wire portion is smaller than a length of the second side and greater than a length of the line segment between the first position and the second position of the first side.

5. The array substrate according to claim 3, wherein a width of the first wire portion is equal to a width of the third wire portion; and
a width of the second wire portion is greater than the width of the first wire portion and smaller than twice the width of the first wire portion.

6. The array substrate according to claim 3, wherein the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a common electrode line and a width of the first wire portion is greater than three times a width of the second signal line and smaller than four times the width of the second signal line; and
the width of the first wire portion is smaller than a length of the second side and greater than a length of the line segment between the first position and the second position of the first side.

7. The array substrate according to claim 1, wherein the third position is coincident with the first position.

8. The array substrate according to claim 1, wherein the third position is between a first midpoint and the second position;
the first midpoint is a midpoint of the line segment between the first position and the second position of the first side; and
an orthographic projection of an intersection point of the second side and the side, closer to the first wire portion, of the orthographic projection of the second signal line on the electrode layer where the first signal line is located on the first side is located at a side of the first midpoint away from the third position.

9. The array substrate according to claim 8, wherein the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a data line and a width of the first wire portion is greater than twice a width of the second signal line and smaller than three times the width of the second signal line;
the width of the first wire portion is greater than a length of the second side; and
a width of the second wire portion is greater than twice the width of the first wire portion and smaller than three times the width of the first wire portion.

10. The array substrate according to claim 8, wherein a width of the second wire portion is greater than a width of the first wire portion and a width of the third wire portion; and
the width of the first wire portion is equal to the width of the third wire portion.

11. The array substrate according to claim 8, wherein the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a common electrode line and a width of the first wire portion is greater than three times a width of the second signal line and smaller than four times the width of the second signal line;
the width of the first wire portion is greater than a length of the second side; and
a width of the second wire portion is greater than twice the width of the first wire portion and smaller than three times the width of the first wire portion.

12. The array substrate according to claim 1, wherein the third position is at a first midpoint, and the first midpoint is a midpoint of the line segment between the first position and the second position of the first side.

13. The array substrate according to claim 1, wherein the fourth position is coincident with the second position.

14. The array substrate according to claim 1, wherein an angle of a slope of at least one of the first signal line and the second signal line is between 40 degrees and 60 degrees.

15. The array substrate according to claim 1, wherein the third position and the fourth position are both between the first position and the second position;
the second signal line comprises a first line segment;
the first line segment is a portion of the second signal line between the first wire portion and the second wire portion;
the third position is between a first midpoint and the first position, and the first midpoint is a midpoint of the line segment between the first position and the second position of the first side;
the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a data line, and a width of the first wire portion is greater than twice a width of the second signal line and smaller than three times the width of the second signal line, or the second signal line is a common electrode line and a width of the first wire portion is greater than three times a width of the second signal line and smaller than four times the width of the second signal line;
the width of the first wire portion is smaller than a length of the second side and greater than a length of the line segment between the first position and the second position of the first side;

the width of the first wire portion is equal to a width of the third wire portion; and
a width of the second wire portion is greater than the width of the first wire portion and smaller than twice the width of the first wire portion.

16. The array substrate according to claim 1, wherein the third position and the fourth position are both between the first position and the second position;
the second signal line comprises a first line segment;
the first line segment is a portion of the second signal line between the first wire portion and the second wire portion;
the third position is between a first midpoint and the second position;
the first midpoint is a midpoint of the line segment between the first position and the second position of the first side;
an orthographic projection of an intersection point of the second side and the side, closer to the first wire portion, of the orthographic projection of the second signal line on the electrode layer where the first signal line is located on the first side is located at a side of the first midpoint away from the third position;
the first signal line is a gate line;
an inclination angle of the third wire portion relative to the second direction is greater than three times an inclination angle of the first line segment relative to the second direction and smaller than four times the inclination angle of the first line segment relative to the second direction;
the second signal line is a data line and a width of the first wire portion is greater than twice a width of the second signal line and smaller than three times the width of the second signal line, or the second signal line is a common electrode line and a width of the first wire portion is greater than three times a width of the second signal line and smaller than four times the width of the second signal line;
the width of the first wire portion is greater than a length of the second side;
a width of the second wire portion is greater than twice the width of the first wire portion and smaller than three times the width of the first wire portion;
the width of the second wire portion is greater than the width of the first wire portion and a width of the third wire portion; and
the width of the first wire portion is equal to the width of the third wire portion.

17. A light control panel, comprising:
an opposite substrate,
a liquid crystal layer, and
an array substrate,
wherein the array substrate and the opposite substrate are arranged oppositely, and the liquid crystal layer is sandwiched between the array substrate and the opposite substrate,
the array substrate comprises: a first signal line for a sub-pixel row, and a second signal line for a sub-pixel column;
the first signal line as a whole extends in a first direction;
the second signal line as a whole extends in a second direction that is intersected with the first direction;
the first signal line comprises a plurality of bending-line structures directly connected in sequence, and each of the plurality of bending-line structures comprises a first wire portion, a second wire portion and a third wire portion directly connected in sequence;

an extension direction of the first wire portion and an extension direction of the third wire portion are both intersected with the first direction and the second direction, and the second wire portion extends along the first direction;
a center line, extending along the extension direction of the first wire portion, of the first wire portion is intersected with a center line, extending along an extension direction of the second wire portion, of the second wire portion to form a first angle;
the second wire portion comprises a first side and a second side opposite to each other in the second direction, and the first side is located at an inner side of the first angle and the second side is located at an outer side of the first angle;
a side of the first wire portion closer to the second signal line is intersected with the first side at a first position of the first side, and a side of the third wire portion closer to the second signal line is intersected with the first side at a second position of the first side;
a side, closer to the first wire portion, of an orthographic projection of the second signal line on an electrode layer where the first signal line is located is intersected with the first side at a third position of the first side, and a side, closer to the third wire portion, of the orthographic projection of the second signal line on the electrode layer where the first signal line is located is intersected with the first side at a fourth position of the first side; and
a length of a line segment between the first position and the second position of the first side is greater than a length of a line segment between the third position and the fourth position of the first side;
wherein the second signal line comprises a first line segment;
the first line segment is a portion of the second signal line between the first wire portion and the second wire portion; and
the first line segment and the third wire portion are inclined toward a same direction with respect to the second direction.

18. A display device, comprising:
a display panel,
a backlight unit, and
a light control panel,
wherein the display panel, the light control panel and the backlight unit are stacked, the display panel is located on a light output side of the light control panel, and the backlight unit is located on a side of the light control panel away from the display panel;
the light control panel comprises: an opposite substrate, a liquid crystal layer, and an array substrate;
the array substrate and the opposite substrate are arranged oppositely, and the liquid crystal layer is sandwiched between the array substrate and the opposite substrate
the array substrate comprises: a first signal line for a sub-pixel row, and a second signal line for a sub-pixel column;
the first signal line as a whole extends in a first direction;
the second signal line as a whole extends in a second direction that is intersected with the first direction;
the first signal line comprises a plurality of bending-line structures directly connected in sequence, and each of the plurality of bending-line structures comprises a first wire portion, a second wire portion and a third wire portion directly connected in sequence;

an extension direction of the first wire portion and an extension direction of the third wire portion are both intersected with the first direction and the second direction, and the second wire portion extends along the first direction;

a center line, extending along the extension direction of the first wire portion, of the first wire portion is intersected with a center line, extending along an extension direction of the second wire portion, of the second wire portion to form a first angle;

the second wire portion comprises a first side and a second side opposite to each other in the second direction, and the first side is located at an inner side of the first angle and the second side is located at an outer side of the first angle;

a side of the first wire portion closer to the second signal line is intersected with the first side at a first position of the first side, and a side of the third wire portion closer to the second signal line is intersected with the first side at a second position of the first side;

a side, closer to the first wire portion, of an orthographic projection of the second signal line on an electrode layer where the first signal line is located is intersected with the first side at a third position of the first side, and a side, closer to the third wire portion, of the orthographic projection of the second signal line on the electrode layer where the first signal line is located is intersected with the first side at a fourth position of the first side; and a length of a line segment between the first position and the second position of the first side is greater than a length of a line segment between the third position and the fourth position of the first side;

wherein the second signal line comprises a first line segment;

the first line segment is a portion of the second signal line between the first wire portion and the second wire portion; and the first line segment and the third wire portion are inclined toward a same direction with respect to the second direction.

\* \* \* \* \*